Dec. 22, 1964 J. F. ARMSTRONG Re. 25,701

INJECTION CARBURETION

Original Filed June 20, 1955 8 Sheets-Sheet 1

INVENTOR.
JAMES FRED ARMSTRONG
BY George P. Ericson
ATTORNEY

INJECTION CARBURETION

Original Filed June 20, 1955 8 Sheets-Sheet 2

INVENTOR.
JAMES FRED ARMSTRONG
BY George R. Ericson
ATTORNEY

INJECTION CARBURETION

Original Filed June 20, 1955 8 Sheets-Sheet 3

INVENTOR.
JAMES FRED ARMSTRONG
BY George P. Ewson
ATTORNEY

INJECTION CARBURETION

Original Filed June 20, 1955 8 Sheets-Sheet 4

INVENTOR.
JAMES FRED ARMSTRONG
BY George R. Ericson
ATTORNEY

INVENTOR.
JAMES FRED ARMSTRONG
BY George R. Ericson
ATTORNEY

INVENTOR.
JAMES FRED ARMSTRONG
BY George R. Ericson
ATTORNEY

INJECTION CARBURETION

Original Filed June 20, 1955 8 Sheets-Sheet 7

INVENTOR.
JAMES FRED ARMSTRONG
BY George R. Ericson
ATTORNEY

INJECTION CARBURETION

Original Filed June 20, 1955 8 Sheets-Sheet 8

INVENTOR.
JAMES FRED ARMSTRONG
BY George R. Ericson
ATTORNEY

United States Patent Office

Re. 25,701
Reissued Dec. 22, 1964

25,701
INJECTION CARBURETION

James F. Armstrong, St. Louis, Mo., assignor, by mesne assignments, to ACF Industries, Incorporated, New York, N.Y., a corporation of New Jersey Original No. 2,785,669, dated Mar. 19, 1957, Ser. No. 516,358, June 20, 1955. Application for reissue Mar. 18, 1959, Ser. No. 800,354
83 Claims. (Cl. 123—119)

Matter enclosed in heavy brackets [ ] appears in the original patent but forms no part of this reissue specification; matter printed in italics indicates the additions made by reissue.

This invention relates to a fuel flow regulating and distributing device which is responsive to engine requirements to adjust to the fuel-to-air ratio in the charging mixture for an internal combustion piston engine. More specifically, the invention is concerned with devices of this kind in which the fuel is pressurized, measured in accordance with engine requirements, and distributed at points adjacent the intake valves of the several cylinders of the the engine.

In order to perform these necessary functions in the intended manner, the device comprises a plurality of sensing means for engine requirements, preferably responsive to air velocity and pressures in the intake system for indicating the fuel requirements of the engine, and these, in turn, control fuel metering means in passages supplied with fuel under pump pressure and delivering the metered fuel to the engine uniformly with respect to each cylinder to meet these requirements.

This description will be limited to the system as applied to one group of cylinders, but it is contemplated that the combination described, as well as its various parts, or subcombinations of parts, have other applications in the general art of fuel feeding, since the same principles apply whether the fuel is supplied to one group or several groups of cylinders, or to one or more groups of burners.

According to this invention, charging air is manually controlled, and the sensing means for indicating fuel requirements is responsive, either directly or indirectly, to indicate such variables as engine speed, engine load, and engine operating temperature. The response indications of the sensing means are, in turn, transmitted to control elements for varying the area of metering orifices in a fuel metering part of the device. Fuel under pressure is fed to this fuel metering part of the device by a pump through a pressure regulator. In the fuel metering part referred to, the flow path of the fuel is divided into separately metered fuel distributing circuits connected to separately operate one or more differential pressure operated valves discharging into the engine induction system. Each valve is urged open by the force due to fuel pressure in one of these distributing circuits which delivers fuel for engine charging, and is urged closed by an opposing force due to the action of metered fuel flow into a distributing circuit creating a datum pressure or pressures. These pressures act on opposite sides of a diaphragm in each differential pressure operated valve.

Some of the advantages to be gained from the arrangement of elements in this system may be realized by a recognition of the basic principles involved in their arrangement. In this system, the same pressure source feeds both of the distributing circuits, and any pressure variations at the source tend to produce porportional pressure variations in each distributing circuit downstream of each metering orifice. The valve construction is such as to maintain a substantially constant difference in pressure between the distributing circuit for engine charging and the one for datum pressure. It follows, therefore, that datum pressure will fix the pressure drop across the metering orifice for the distributing circuit for engine charging.

It is known that fuel will vary directly with variations in orifice area when the pressure drop across the orifice is held constant and the flow coefficient does not change. This principle applied to the present system means that fuel flow in the distributing circuit for engine charging will vary directly with the area of the metering orifice, provided that area of the orifice for the datum pressure distributing circuit is fixed. This principle will hold true regardless of any fluctuation of pressure in the source—that is, in this case, in the pump or pressure regulator.

Since both distributing circuits has a common pressure source and a constant differential pressure is maintained between them on the downstream side of the orifices for both, then variations of the metering orifice for the distributing circuit for datum pressure varies the pressure drop across all of the metering orifices simultaneously and in a like manner. Because of this pressure drop, the flow through the distributing circuit for engine charging will increase with each increase in the pressure drop across the metering orifice for the datum pressure circuit, and vice versa.

In the structure hereinafter described, the distributing circuit for datum pressure connects between the fuel pressure source and the intake for the pump, and can be termed a by pass around the pump. This is for purposes of convenience, and is not primarily depended upon to maintain a constant pump discharge pressure as in many of the systems in the prior art. The variations in pressure in the datum circuit can be established by varying the size relation between a metering orifice at its inlet and one at its outlet. The preferred manner is to vary the inlet orifice area by means of a contoured metering rod supported for longitudinal movement in the orifice. Position of this rod depends upon indications of an engine requirement sensing means responsive to indicate engine load and engine temperature. This metering structure is entirely enclosed in a container for the pressurized fuel, and the indications of the engine condition sensing means are transmitted into rod movement by means of a magnetic clutch. This type of transmission avoids the friction inherent in diaphragms, seals, or packings, and increases the sensitivity to changes in engine requirements. Datum pressure changes are effected in the datum circuit during engine operation in response to indications of the sensing means, and these directly affect the amount of fuel discharged to the engine.

In the preferred form of the invention, the fuel distributing circuit for engine charging has individual branches with individual metering orifices, and each branch connects to one differential pressure operated valve. The area of these orifices is controlled by suitably contoured metering rods supported for movement in unison by indications transmitted from an engine requirement sensing means. Preferably this sensing means is one responsive to rate of air flow through the induction system or its equivalent engine speed combined with throttle opening, which are variables determining this function. The rods are enclosed within a fuel pressure container, and transmission between the sensing means and rods is also by a magnetic clutch.

In a system having a constant pressure drop, the use of metering rods has a definite, practical utility. Thus, where the shape of the mixture curve for a particular engine is known, as well as the limits of maximum rod travel in the orifices, the procedure for calibration is simplified. By calculation, rod size can be determined for points between these limits to correspond with the rate of flow indicated by points on the curve, and the rod then contoured. The flow curve will be reproduced in the metering for any constant pressure drop which is fixed by constant metering of datum pressure and can be raised or lowered between any desired limits by variations in datum metering. These limits, in turn, can be readily fixed by a manual adjustment applied in a novel way to determine the upper, or full rich position of the curve, and the lower or part-throttle position of the curve.

In order to provide for satisfactory operation when the engine is cold, the system includes a temperature sensing means for effecting datum pressure metering to enrich the mixture and increase the manually controlled charging air for fast idle.

Also incorporated in the system is an unloader system operative to cut off the fuel supply and give maximum air flow to the engine during engine starter motor operation.

This system, including its several features, as above described, may take various forms. By way of example, one of these forms is illustrated both diagramatically and structurally in the accompanying drawings, in which.

AIR INDUCTION SYSTEM

FIGS. 1 to 7 of the drawings schematically illustrate one form of an engine charge forming device embodying the above described system. For the purpose of convenience in illustration, the fuel metering system A and the air induction system B are shown separately.

Figure 1:
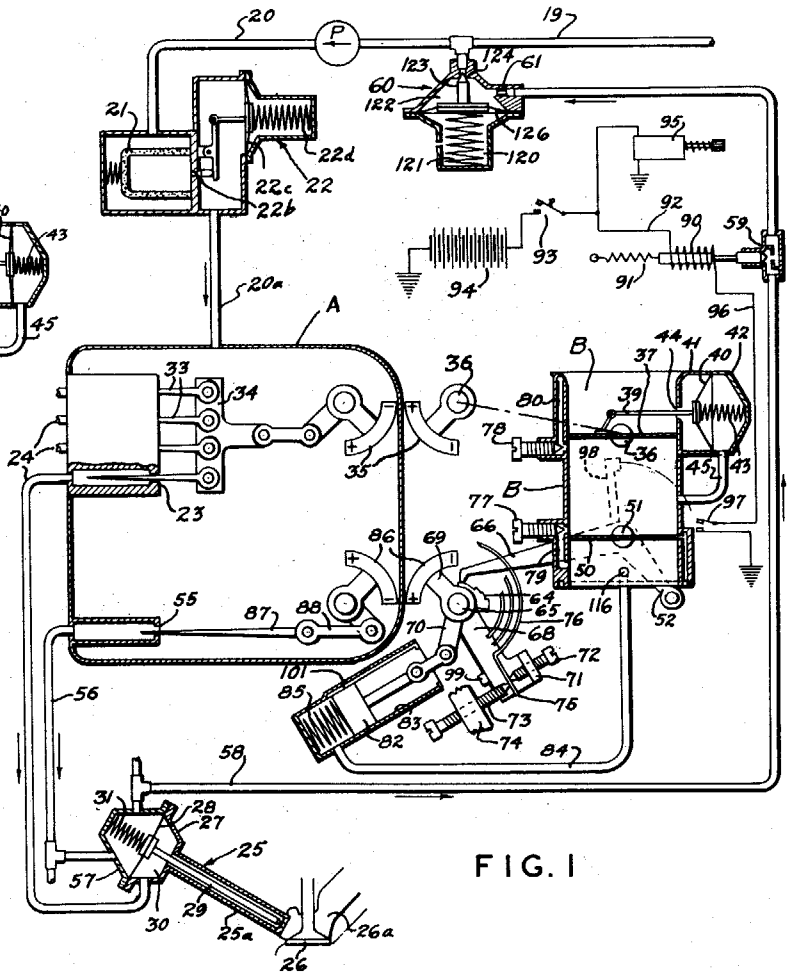
FIG. 1 is a schematic showing of one embodiment of an engine charging system illustrating the parts of the system in the positions assumed at engine idling speeds and normal operating temperatures.

The air induction system B has a single air conduit body through which all of the charging air passes to a plurality of branches connecting with the cylinder intake ports of the engine 26a, one of which is shown in FIG. 1. Each port 26a is separately controlled by an engine intake valve 26, all in a well known manner.

AIR FLOW SENSING DEVICE

Within the air conduit body B is a balanced butterfly air valve 37 mounted on a shaft 36 journaled for rotation in the side walls of the air conduit body. Mounted on one side of the air conduit body is a housing which is divided into a pair of chambers 41 and 42 by a diaphragm 40. Chamber 41 is connected with air conduit B through a port 44 in the wall thereof anterior of the air valve 37. A tube 45 connects the opposite chamber 42 with the air conduit B posterior of the air valve 37. The rod 39 interconnects the air valve 37 and the diaphragm 40 in such a manner that pressures acting on the diaphragm in the chambers 41 and 42 will position the valve 37 angularly in response to pressures sensed on opposite sides of the valve through the port 44 and the tube 45. A spring 43 calibrated to give the proper resistance urges the valve 37 to the closed position.

The air valve diaphragm arrangement above described is operated by differences in pressure in the air conduit B as sensed by the ports anterior and posterior of the valve. It will therefore take up a position in response to this sensing means which will indicate directly by its angular displacement the rate of air flow passing through the air conduit B, and, since the rate of air flow is dependent primarily upon engine speed and throttle opening, the angular position of the valve 37 when balanced in the air flow through the conduit B will be an indication of these two engine variables.

In order to provide for some adjustment of the angular indication of the valve 37 in response to these variables, air conduit body B is provided with a by-pass 80 and an adjustable metering screw 78. By adjusting the rate of air flow through the by-pass 80, the indication of the air valve 37 to rate of air flow can be changed to suit the calibration of the metering means for fuel which it controls.

The calibration of the spring 43 is such that the angular position assumed by the valve 37 is determined by only a slight pressure change on its opposite sides, such as a constant pressure drop of 8 or 10 inches of water.

Below the air valve 37 is a manually controlled throttle valve 50 mounted on a shaft 51 journaled in the walls of the conduit B. Operating lever 52 is secured to shaft 51, and provides for attachment of the usual manual control.

ENGINE LOAD AND TEMPERATURE SENSING DEVICE

Below the throttle 50 is a port 116 in the wall of the conduit B connected by a line 84 with a cylinder 83 below a piston 82 in the cylinder. Cylinder 83 is open at its upper end to a chamber (not shown) containing the thermostatic enrichment coil spring 76. This chamber is, in turn, connected to a source of engine heat. The difference in pressure on opposite sides of the piston 82 during the engine operation at idle and normal cruising speed of the vehicle causes the piston to assume the position shown in FIG. 1, compressing the spring 85 beneath the piston.

Figure 5:
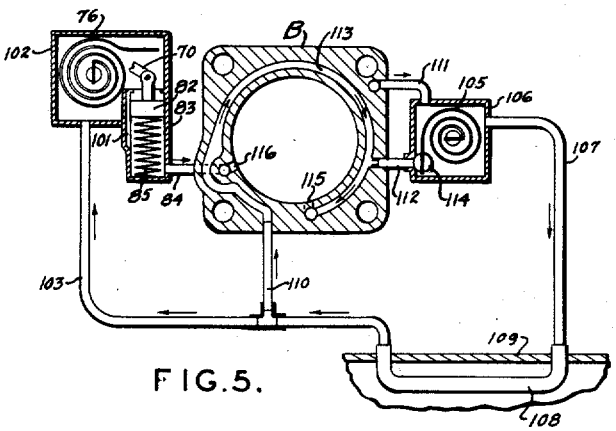
FIG. 5 is a schematic illustration of the de-icing structure, and illustrates the air conduit body in cross-section, the heating passages, and the control for heated air positioned to supply heated air to the air conduit body.

This pressure difference also causes a continual flow of air from a source of heat 108 in FIG. 5 through the thermostat chamber enclosing the thermostatic enrichment coil spring 76 past the piston through the by-pass 101 and into the conduit B by way of line 84 extending to port 116.

Movements of the piston 82 within the cylinder 83 are communicated through a piston rod connected with a lever 70 to a shaft 65 upon which is mounted a lever 68 having an offset lug 71 threaded to receive adjusting screw 72. Thermostatic enrichment coil spring 76 has its inner end concentrically arranged with the shaft 65 and secured to some fixed portion within the chamber. Its outer end projects radially of the shaft 65 into abutting relation with the inner end of screw 72 and, at normal engine operating temperatures, contacts the inner end of screw 73 threadedly mounted within a fixed portion 74 of the chamber structure. The radial extension 75 also forms an abutment for the lug 99 on the lever 68.

This structure forms a sensing means connected with the air conduit B which will indicate by position of the shaft 65 the amount of load under which the engine is operating. Likewise, since the thermostat 76 is heated preferably from a source 108 on the engine, shaft 65 may also take up a position responsive to both engine load and engine temperature.

At normal engine load and normal engine temperatures, the parts will assume the position as shown in FIG. 1, with the piston 82 depressed and adjusting screws 73 and 72 engaging the radial extension 75 of the thermostat. As engine load increases, however, spring 85 will expand due to the decreasing force exerted on the piston 82 by the difference in pressure on its opposite sides. Movement of the piston in response to the spring engages the lug 99 with the radial extension 75 on the thermostat 76, thereby rotating the shaft 65 to a position indicating a change in the fuel requirements of the engine from part-load to full-load. The parts will then take the position shown in FIG. 2.

Figure 3:
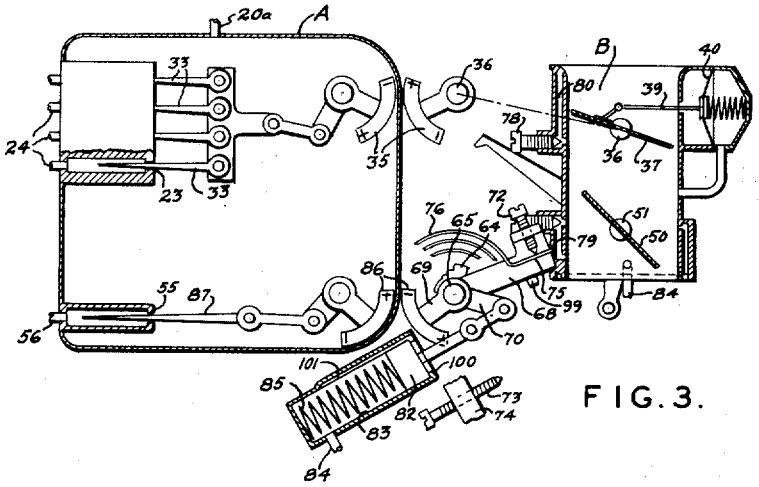
FIG. 3 shows the parts of the system during part-throttle operation and operating temperatures below normal.
Figure 4:
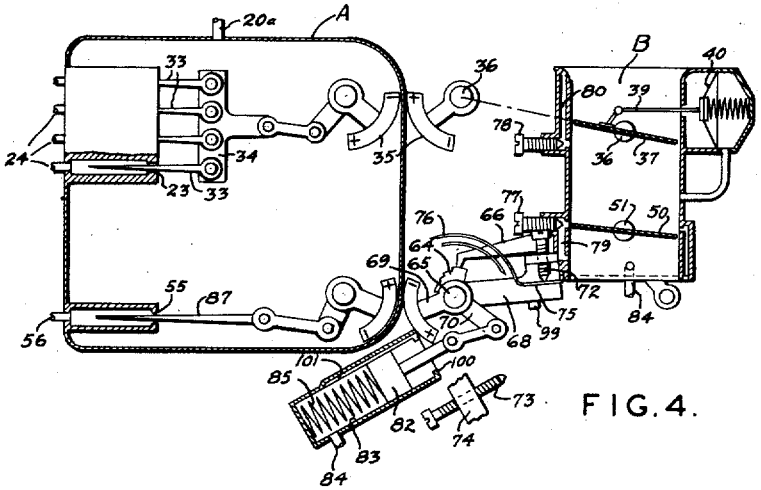
FIG. 4 shows the parts of the system in the positions which they will assume at engine idling speeds and at engine temperatures below normal.

The construction of the thermostat 76 is such that decrease in temperature tends to rotate the radial extension 75 in a counterclockwise direction to a position such as shown in FIG. 3 and FIG. 4. This, in turn, produces an angular displacement of the lever 68 in the same direction, and rotation of the shaft 65 to another position or positions indicated by the engine temperature. Where, at the same time, the engine load is heavy, the position of the parts will be such as that indicated in FIG. 3, which illustrates the extreme displacement of the lever 68 in a counterclockwise direction, and similar movement of the shaft 65.

Where the engine load is light and engine temperature is low, the position of the parts is illustrated in FIG. 4, wherein the piston 82 has compressed the spring 85 to place the shaft 65 in a new position indicating light load at low temperature.

Shaft 65 also carries a fast idle cam 64 which cooperates with a finger on lever 66 secured to the manually operated throttle shaft 51 so as to open the throttle 50 slightly in FIG. 4 at low engine temperatures to increase engine idle speed.

Shaft 65 and its temperature and pressure control form a sensing means which will indicate by the position of the shaft 65 both load and temperature condition of operation for the engine, and indications of this sensing means are transmitted to the fuel metering system by the position of shaft 65.

Air conduit B has a by-pass 79 around the manual throttle 50 controlled by an adjusting screw 77. This control provides for regulating the air flowing past the manual throttle when in the idle positions. As will be readily recognized, screw 77 corresponds in function with the ordinary mixture regulation screw in the conventional carburetor.

FUEL METERING SYSTEM

As will be described hereinafter more fully, positions of the indicating means controlled by the sensing means are transmitted to position fuel metering mechanism within a fuel metering part indicated in the drawings as A. The fuel supply to the metering part A is by way of a line 19 from a suitable source of fuel to pump P, and thence, by way of line 20, to a pressure regulating device 22. Fuel entering the regulator passes first through a filtering element 21 to a control valve 22b operated by pressure downstream of the valve 22b acting on a diaphragm 22c against the resistance of a calibrated spring 22d. Suitable mechanism is provided for mechanically connecting the valve 22b to be operated by movements of the diaphragm under the influence of pressure of fuel downstream of the valve acting in one direction and atmospheric pressure and spring 22d acting in the opposite direction. Regulator 22 is preferably adjusted to deliver about twenty-five pounds of gauge pressure through the line 20a to the chamber enclosing the fuel metering part indicated as A. Because of features of the system which are inherent in the arrangement of valves and hydraulic circuits, it is not necessary that the pressure regulator 22 maintain a precisely constant pressure in the metering part of the metering chamber. Accurate metering does not depend upon accurate pressure regulation in this part of the system.

Within the fuel metering chamber A is a fuel charge control mechanism comprising one or more metering orifices 23 receiving one or more contoured metering rods 33 mounted on a carriage 34 for movement within the metering orifices 23. Each orifice 23 controls the flow to a separate fuel charging line 24 connecting at its opposite end to a fuel nozzle 25. Preferably, there are as many metering orifices 23, metering rods 33, and fuel charging lines 24 connecting with nozzles 25 as there are cylinders in the internal combustion engine, but it will be appreciated that alternative arrangements are possible wherein one metering orifice and rod may control the supply to one or more fuel nozzles 25. Likewise, the number of fuel nozzles 25 may vary from one to a number corresponding with each of the cylinders. Proper location of the fuel nozzles is a matter of choice in order to obtain good fuel distribution between the several cylinders of the engine. Fuel metered through the orifices 23 into the line or lines 24 is eventually fed directly to the induction system of the engine from fuel nozzles 25. Consequently, these elements form the distributing circuit for engine charging. The position of the carriage 34, and consequently the position of the metering rods 33, is determined by the position of shaft 36 through the magnetic clutch 35, one part of which will take a position indicated by the air valve 37 acting in response to engine air requirement.

Also within the fuel metering part A is a metering orifice 55 controlled by a metering rod 87. The position of this rod within the orifice determines the rate of flow from the chamber A to a distributing system for datum pressure. This circuit includes a plurality of lines interconnecting each of the fuel nozzles 25 and discharging through a line 58 and variable orifice 60 to the supply line 19. Fuel is supplied to this circuit from the metering orifice 55 through a connecting line 56 between the orifice and the lines of the distributing circuit.

The flow restriction 60 comprises a seat in the outlet controlled by a needle valve 123 actuated, in turn, by fuel pressure in the chamber 122 acting on the diaphragm 126 against the resistance of spring 121 and atmospheric pressure communicated to the chamber 120. Pressure in the distributing circuit for datum control is increased or decreased, as the case may be, by adjusting the area of the orifice 55 by rod 87. The larger the area of the orifice, the greater will be the datum pressure, and vice versa. In order to avoid the friction inherent in stuffing boxes, packing glands and diaphragms, position of the needle 87 is controlled by a magnetic clutch which transmits the motion of the shaft 65 outside the fuel chamber A to the needle 87. The position of the shaft 65 indicates the response of the engine sensing means for load and engine operating temperature, as above described.

FUEL NOZZLES

In a fuel feeding system using more than one fuel nozzle, the particular construction affords, not only uniform delivery between the nozzles, but also uniform fuel metering to each. The valve 25 has a casing 27 forming a chamber 30 at one end, and an extension 25a with a seat for the valve stem 29. The extension 25a is suitably secured in the engine cylinder head in a position to discharge adjacent the intake valve 26. Diaphragm 28 is secured to the stem 29 and forms a closure for the chamber 30. A cap 57 secures the diaphragm in place and houses a coil spring 31 urging the valve 29 on its seat. The diaphragm and spring control of the fuel nozzle control valve assembly is so designed that a difference of fuel pressure of about a half-pound on opposite sides of the diaphragm is necessary to unseat the valve 29.

Each line 24 in the distributing circuit for engine charging connects with each chamber 30 in each fuel nozzle, so that engine charging pressure is applied beneath the diaphragm 28 in a valve opening direction. Each chamber within cap 57 of the fuel nozzle control valve is, in turn, connected with the distributing circuit containing datum pressure, so that datum pressure in this chamber opposes movement of the valve 29 in the opening direction. This particular pressure acting to close the valve 29 is, in turn, determined as a function of the area of the metering orifice 55 by the position of the needle valve 87. Increases in area of the orifice 55 will be accompanied by increase in datum pressure, and this, in turn, decreases the pressure drop across orifices 23 in the distributing circuit for engine charging to decrease the flow of fuel to the engine regardless of the position of the metering rods 33.

Decrease in the area of the metering orifice 55 by movement of the rod 87 into the orifice decreases the datum pressure, and thereby the resistance of the valve 29 to opening, thereby increasing the pressure drop across the orifices 23 to increase the fuel flow to the distributing circuit for engine charging. It will be appreciated that datum pressure changes produce an inverse effect, increasing the pressure drop across the orifices 23 with decrease in datum pressure, and decreasing the pressure drop across the orifices 23 with increased datum pressure. Because the flow across the orifices 23 will vary directly with the pressure drop, other things being constant, then it becomes apparent that the sensing means for engine load and temperature, which determines the datum pressure, will have an indirect control through its own hydraulic linkage with the fuel nozzles 25 to vary the fuel delivered to the engine.

Where there are a multiplicity of fuel nozzles 25, each is connected to the datum pressure distributing circuit, and, due to this hydraulic interconnection, there will be a positive force acting on each diaphragm which is substantially equal in each nozzle.

The second function performed by the fuel nozzle control valve is that of maintaining a constant pressure drop between the distributing circuit for engine charging and the distributing circuit for datum pressure. As stated heretofore, it requires approximately a half-pound difference in pressures on opposite sides of the diaphragm 28 to open the valve 29. Any increase in this difference in pressure due to increases in pressure in the distributing circuit for engine charging will produce a displacement of the valve 29 in an opening direction so as to restore the pressure difference by increasing the discharge from the fuel nozzle. Of course, the reverse of this action will take place, since any decrease in this pressure differential allows the valve 29 to close and decrease the flow.

Both orifices 23 and 55 are fed from the same pressure source, and it therefore becomes apparent that fluctuations in this pressure source will be reflected downstream of the orifices in proportional amounts. When these pressure fluctuations occur, there will be no effect upon the fuel discharge from the fuel nozzles, since this depends wholly upon the pressure difference between the lines in the distributing circuits for engine charging and datum pressure. Likewise, since the flow from the nozzles remains unaffected, it follows that the pressure drop across the orifices 23 remains a constant for any given position of the needle valve 87 regulating datum pressure, and the entire fuel feeding system will remain in balance due to the fact that the fuel nozzle control valve assemblies regulate the pressure downstream of the orifices 23 to maintain a constant pressure drop therein.

Unlike prior systems, no attempt is made to hold the pressure upstream of the metering devices constant by a valved by-pass connecting opposite sides of the orifices. The defect in such systems is apparent because a pressure change must occur downstream before correction can be made upstream of the orifice. It follows that the metered flow must change before correction is made.

The datum pressure distributing circuit described herein amounts to a by-pass, but its function in the combination is distinct from that in prior devices in this respect. It is not primarily intended to function as a pressure regulator for the chamber enclosing metering part A. Such an effect, if any, is merely incidental in its operation.

ENGINE TEMPERATURE AND DE-ICING CIRCUIT

Figure 6:
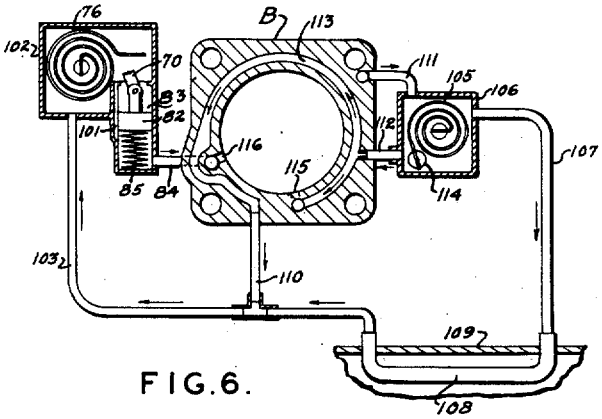
FIG. 6 illustrates the de-icing structure with the controls in a position to by-pass the heated air around the air conduit body passages.
Figure 7:
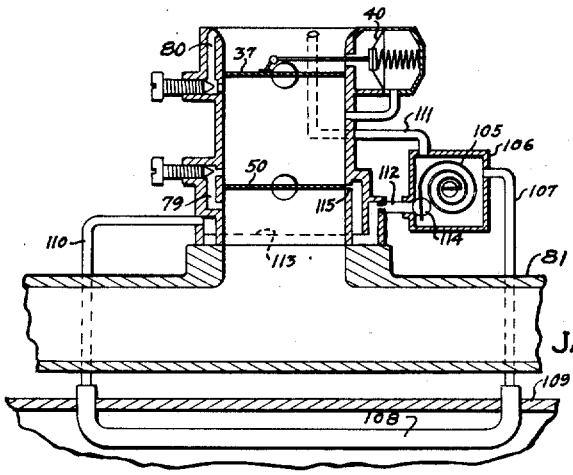
FIG. 7 is an elevational view, in section, of the heating circuit diagrammatically illustrated in FIGS. 5 and 6.

FIGS. 5 to 7, inclusive, are views illustrating schematically in horizontal and vertical section the system for operating the engine temperature sensing thermostat 76 combined with a system for applying heat adjacent the manual throttle 50 to avoid icing. In this heating system, a port adjacent the entrance to the air conduit body is connected by a line 111 with a chamber 106 containing a thermostat 105 operating a valve 114 for closing a by-pass passage 112. Chamber 106 is connected by a line 107 with a heater 108 disposed within the water jacket or exhaust manifold 109 of the engine. The heater is connected by way of branch passages 103 and 110 to the thermostat chamber 102 and the passage 113 within the air conduit body B. Chamber 102 contains thermostat 76 and also the piston 82 operating in the cylinder 83 which, in turn, connects with an arm 70 on shaft 65 (not shown). A by-pass 101 controlled by the position of the piston 82 interconnects the chamber 102 with the line 84 leading to a port 116 in the air conduit body B posterior of the throttle 50. The operation of the thermostat and piston as an engine temperature and load sensing means has already been described and will not be repeated here except insofar as to explain the response of thermostat 76 to engine temperature.

Passage 113, which also receives heated air, is located adjacent the edge of throttle 50, and discharges through a port 115 at the edge of the throttle.

FIG. 5 illustrates the position of the parts when the engine is cold. During this engine condition, thermostat 105 is uncoiled, closing valve 114 and shutting off the by-pass line 112 communicating with the heating passage 113. Similarly, thermostat 76 is uncoiled, rotating the shaft 65 counterclockwise, and raising the piston 82 to its extreme upper position in the cylinder 83.

When the engine is started, suction at the port 116 will be sufficient under any condition of engine operation to cause piston 82 to compress spring 85 so as to open the by-pass passage 103 to some extent. Communication is then established from the port 116 to the chamber 102, and thence to heating element 108. The suction at port 116 will cause a flow of air into thermostat chamber 106 from line 111, and from thence into line 107, heater 108, and thermostat chamber 102. If the engine is operated with the throttle 50 slightly open, port 115 will be posterior of throttle 50, and suction at the port 115 will cause a flow of heated air through the line 110, passage 113, to the port 115.

FIG. 6 indicates the position of the parts during operation of the engine at normal tempertures. Under these conditions, under-hood temperatures will be sufficient to raise the temperature of the air entering the thermostat chamber 106 from the line 111, and thermostat 105 will respond to open the valve 114 to some degree. When this valve is open, the air flow from the chamber 106 will be divided between the line 107 and the line 112. Some of the air entering the chamber 106 will pass through heater 108, while the remainder will pass through line 112 to passage 113, where the flow will be divided again with some flowing directly to the port 115. The remainder circulates through the passage 113 to line 110 to mix with the heated air from the heater 108 passing through the line 103 to the thermostat chamber 102. This will modulate the heating effect on the thermostat 76 so as to prevent strain on the thermostat from overheating. Heated air from the chamber 102 passes through the cylinder 83 by way of by-pass 101 to the port 116. This will continually apply some heat to the thermostat 76 after the engine has reached normal operating temperatures.

FUEL CHARGE UNLOADER

Referring to FIG. 1, the unloader system provided for the fuel metering system has a valve 59 located in the datum pressure by-pass line 58 which is operated only at substantially wide-open throttle positions during the starter motor operation for cranking the engine. Valve 59 is maintained in the open and inoperative position by a spring 91, and closed on energization of a solenoid 90 connected by a line 92 between the starter switch 93 and the starting motor 95. The starting switch 93 is connected directly with the primary of a battery 94. The solenoid 90 is connected with ground through a line 96 connecting with unloader switch 97. This switch 97 is so located as to be closed by action of a lever 98 on the throttle shaft 51 when the throttle 50 is moved manually to nearly wide-open position.

With both switches 93 and 97 closed, the engine is cranked, and, simultaneously, valve 59 closes. As a result, datum pressure becomes equal to the charging pressure in the metering part A, and, since a half-pound differential or more is necessary to open the fuel nozzles 25, all fuel flow through the nozzles is prevented. This operation becomes necessary only in case the engine is flooded for some reason or other and the mixture too rich in the cylinders to be ignited. With the fuel supply shut off, air alone is pumped through the induction system, which will dilute the mixture in the engine cylinders, removing the excess fuel, so that the mixture in the cylinders becomes ignitable. As soon as the engine fires and starter switch 93 is open, the circuit will be broken, and valve 59 will open, due to the action of spring 91.

OPERATION

FIG. 3 illustrates the approximate position of the parts during cranking of the engine at low temperatures. With the throttle 50 partly open to admit sufficient air before starting, air valve 37 will assume some such position as illustrated at the cranking speed of the engine. The position of the valve 37 is indicated by shaft 36, which, in turn, is transmitted through the magnetic clutch 35 to correspondingly position the metering rods 33 in the orifices 23. This will open the orifices 23, and fuel pressure within the chamber A is communicated by way of these orifices to the distributing system for engine charging and fuel nozzles 25.

On the other hand, the temperature of the engine, together with the lack of any suction below the throttle, permits the thermostatic enrichment coil 76 to unwind to its full extent. The position of the shaft 65 in response to thermostat action is transmitted through the magnetic clutch 86 to the datum pressure metering rod 87, which will substantially close the orifice 55. Datum pressure is thereby reduced and, accordingly, the pressure drop across the orifices 23 is correspondingly increased to increase the amount of fuel delivered from the fuel nozzles 25. A rich mixture suitable for starting the engine cold results.

FIG. 4 shows the position of the parts when the engine starts. After the engine starts and throttle valve 50 is closed, engine suction acts to compress spring 85 by forcing the piston 82 downwardly from its position shown in FIG. 3. This action, in turn, is transmitted to the shaft 65, arm 68, and adjusting screw 72, to wind up the thermostatic enrichment coil 76 until equilibrium is reached between the forces acting on piston 82 and the forces acting in the opposite direction in spring 85 and thermostatic enrichment coil 76 to give a suitable mixture during idling operation of the cold engine. In FIG. 4, arm 66 is displaced by cam 64 to crack the throttle 50 and increase engine speed during the warm-up. Of course, the balance in the system can be changed in order to give a full-rich mixture in case it is desirable to operate the engine at full load when cold. Under these conditions, the piston 82 would assume some position between that illustrated in FIG. 3 and that illustrated in FIG. 4.

The position of the parts during idling at normal temperatures is illustrated in FIG. 1, and a description of the operation under these conditions is believed unnecessary in view of the above remarks.

Figure 2:
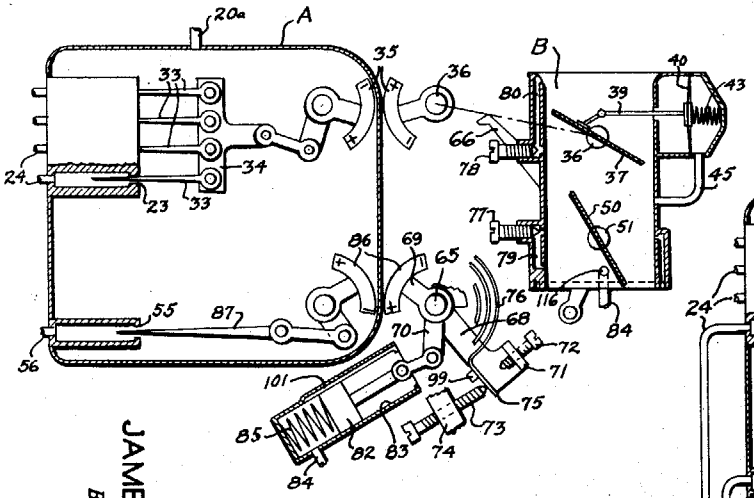
FIG. 2 illustrates the position of parts of the flow sensing means during part-throttle operation of the engine at full load and normal operating temperatures.

FIG. 2 illustrates operation of the engine at substantially full throttle under heavy load or full load conditions. The decrease in difference in pressure operating on opposite sides of the piston 82 allows spring 85 to rotate shaft 65, lever 68, until lug 99 abuts the radial extension 75 on the thermostatic enrichment coil. The position indicated by the shaft 65 is transmitted through the magnetic clutch 86 to move metering rod 87 into orifice 55, thereby increasing the pressure drop at this point. Since the corresponding effect will be had in the orifices 23, fuel flow is stepped up in the distributing system for engine charging to increase the fuel-air mixture ratio, and this will take effect regardless of the position of the metering rods 33. This automatic step-up arrangement can operate at any engine speed, and is useful through substantially the entire range of engine speeds to meet the fuel requirements of full engine load.

STRUCTURAL FORM OF AIR INDUCTION SYSTEM

FIGS. 8 to 20 illustrate an actual structure based on the system above described. Where possible, the same reference characters will be used for the same parts indicated in the prior figures of the drawings.

Figure 8:
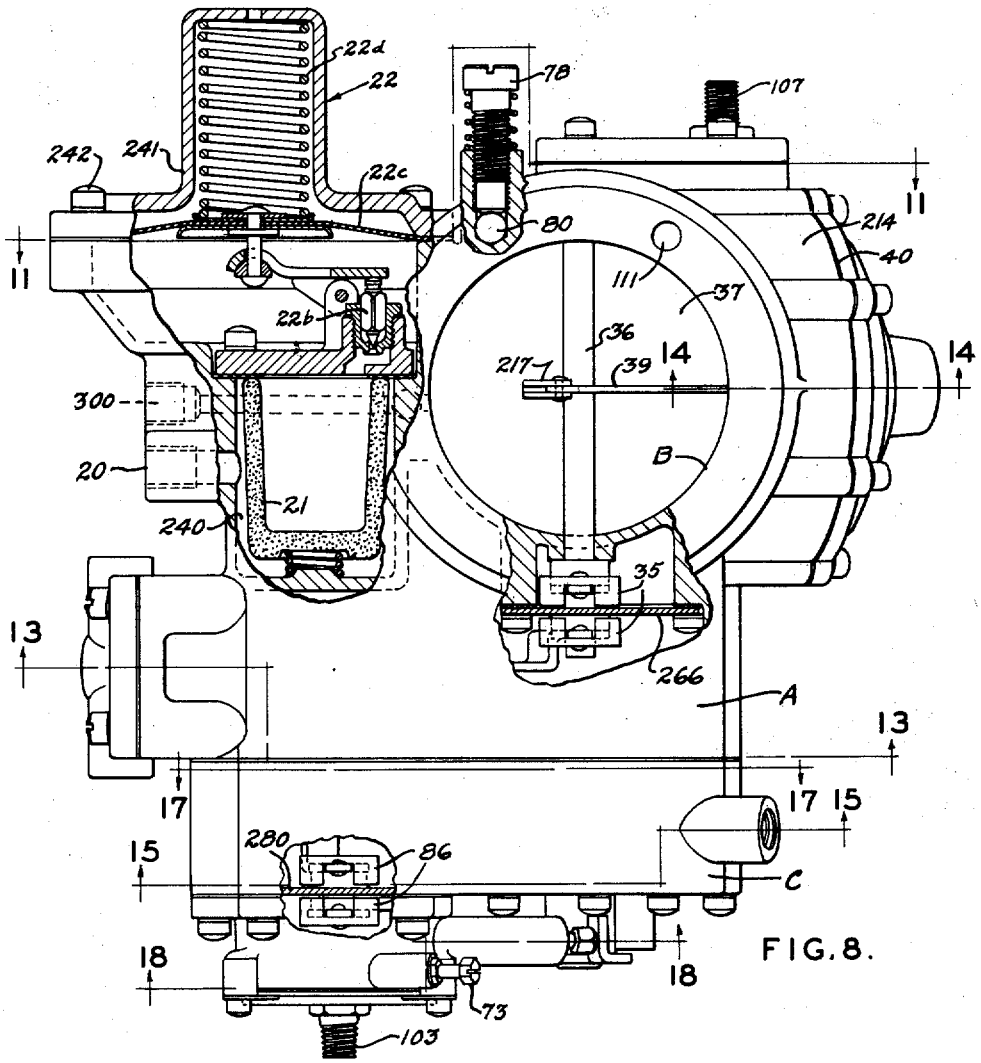
FIG. 8 is a top plan view of a structure embodying the air and fuel metering means schematically illustrated in the prior figures of the drawing.
Figure 17:
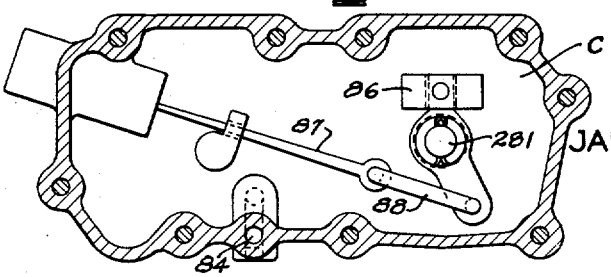
FIG. 17 is an interior view of the mechanism within the detachable housing in FIG. 8 taken substantially on line 17—17 of FIG. 8.
Figure 9:
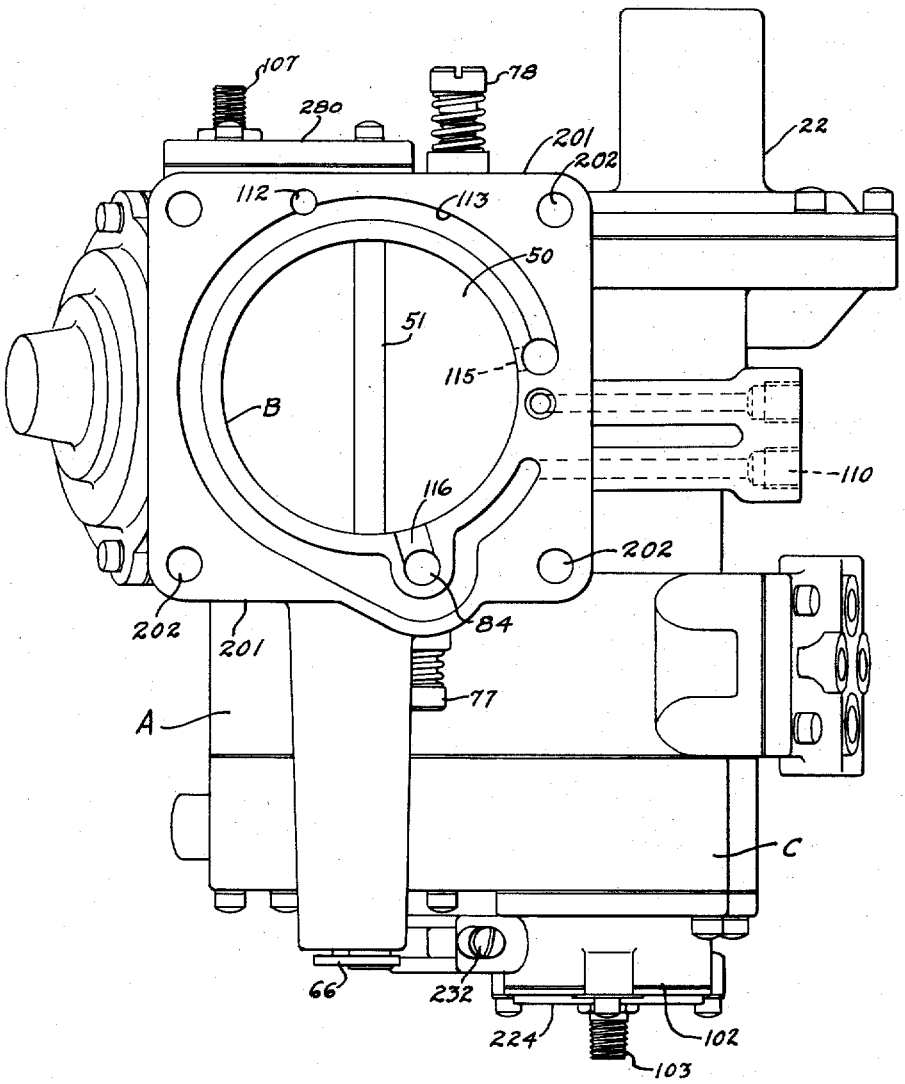
FIG. 9 is a bottom plan view of the same structure.
Figure 10:
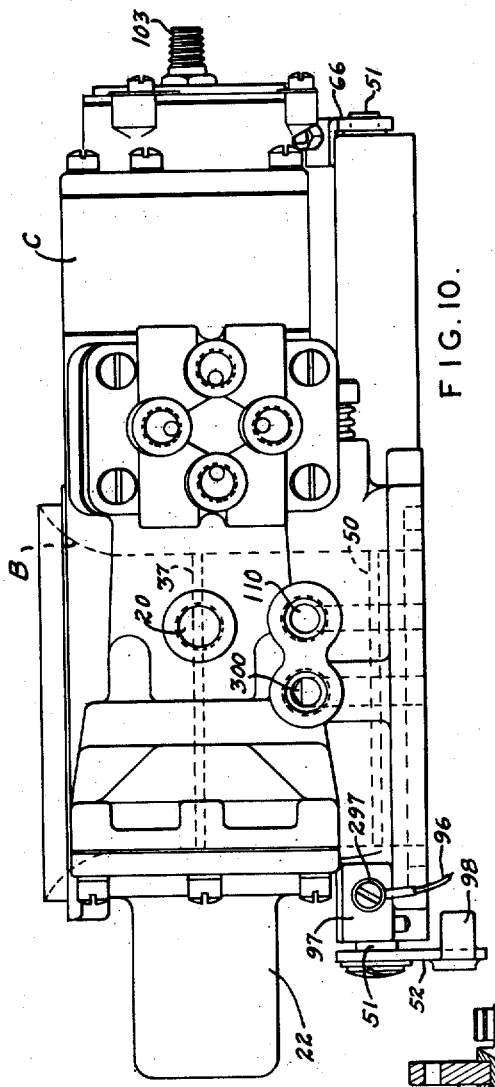
FIG. 10 is a side elevation of the structure shown in FIG. 8 as viewed from the left.
Figure 20:
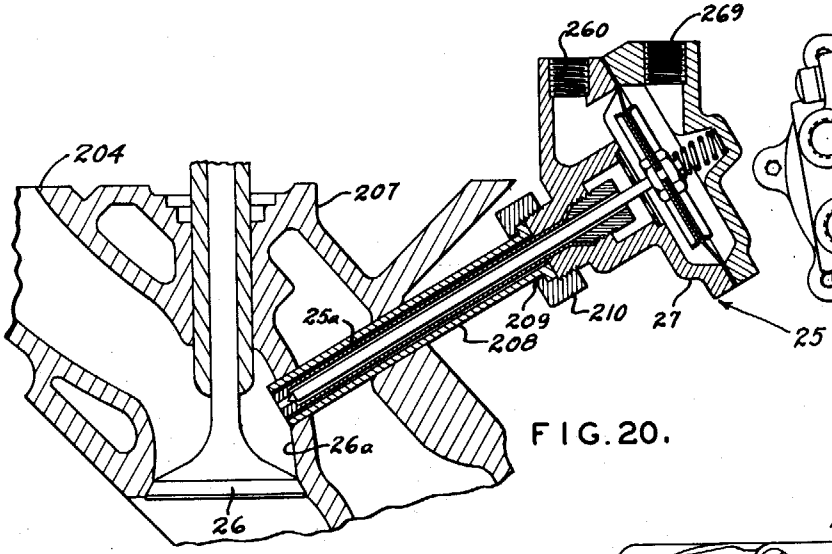
FIG. 20 is a view, in section, of an engine intake passage showing the location and arrangement of the injection nozzle.

According to FIG. 8, the air conduit body B is constructed as a unit with the fuel metering part A. For purposes relating wholly to structural design, the fuel metering part is divided into two castings, shown in the drawings as A and C. The air metering parts of the structure are mounted within the passage through the air conduit body B, the entrance to which is shown in top view in FIG. 8. The bottom view in FIG. 9 illustrates a flange 201 surrounding this passage and provided with suitable bolt holes 202 by which the unit can be securely attached to a branched manifold extending to a number of cylinders in the internal combustion engine. For example, each of the branches connects with an intake port 204 in the cylinder head of the engine as illustrated in FIG. 20. Intake passage 26a communicates with the intake port 204 and is controlled by the intake valve 26 guided for movement within the cylinder head 207.

Adjacent each intake valve 26 and projecting into the intake passage 26a is a mounting tube 208 having a flange and coupling 209 and 210. Casing 27 of the fuel nozzle 25 has suitable threads for engaging the threaded coupling 210 for securing the fuel nozzle 25 in position with the extension 25a positioned adjacent the intake valve 26 and discharging into the intake passage 26a.

The outlet of the air intake passage in the air conduit body B is controlled by a manually operated throttle 50 mounted on a shaft 51 journalled in the walls of the air conduit body B. Manual operation of throttle 50 is effected through suitable connections with a throttle lever 52 shown in FIGS. 10 and 11.

STRUCTURAL FORM OF AIR FLOW SENSING DEVICE

Figure 14:
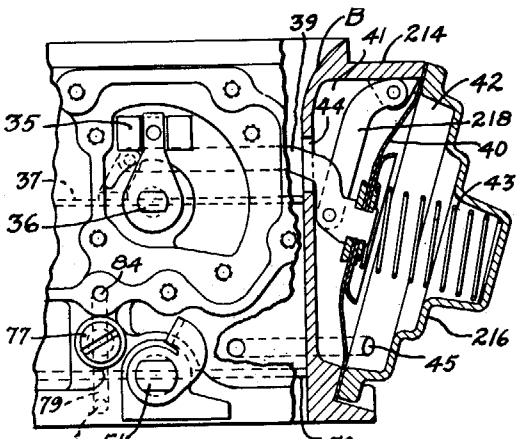
FIG. 14 is a side elevation with parts in section along the line 14—14 of FIG. 8, and a wall plate removed to show the underlying structure.
Figure 16:
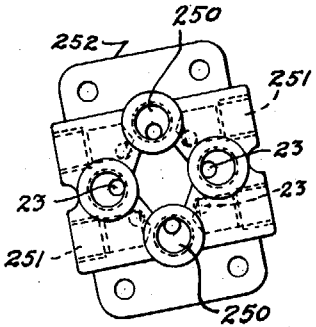
FIG. 16 is a detailed view of the fuel distributing cap showing the arrangement of the individual fuel line connections.

Within the air conduit body B is a balanced butterfly air valve 37, shown in FIG. 8, journalled for rotation in the side walls of the air conduit B on a shaft 36. On one side of the air conduit body B is a housing 214 provided with a cap 216, as shown in FIG. 14. This housing is divided into a pair of chambers 41 and 42 by a diaphragm 40. Chamber 41 is connected with air conduit B through a port 44 in the wall thereof anterior of the air valve 37. A tube 45 connects the opposite chamber 42 with the air conduit B posterior of the air valve 37. Operating rod 39 (FIG. 8) connects between a bracket 217 on air valve 37 and diaphragm 40 in such a manner that the pressures acting on the diaphragm in the chambers 41 and 42 will position the valve 37 angularly in response to pressures sensed on opposite sides of the valve through the port 44 and the tube 45. In order to guide the rod 39 within its proper path of movement and free of frictional engagment with the parts of the structure, the guide link 218 is provided connected between a pivot on the housing and a pivot on the operating rod 39. Spring 43 is calibrated to give the proper rate of resistance, and urges the valve 37 to the closed position.

Figure 11:
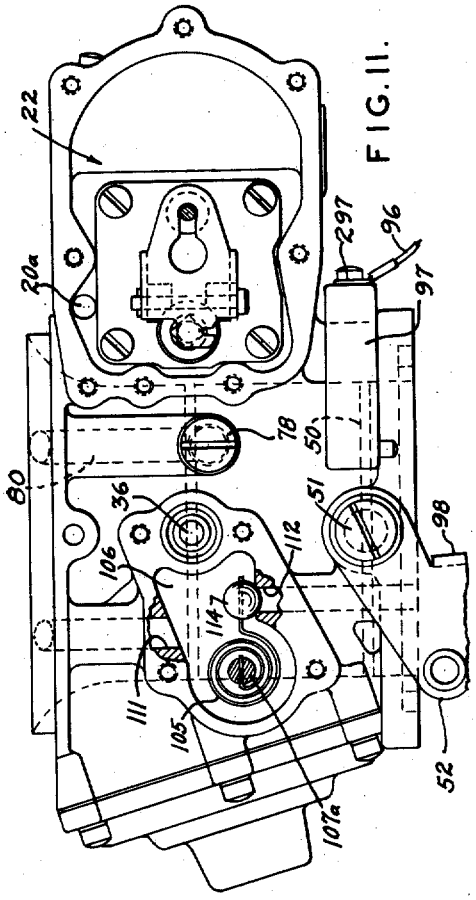
FIG. 11 is a side elevation of the structure shown in FIG. 8 substantially on line 11—11.
Figure 12:
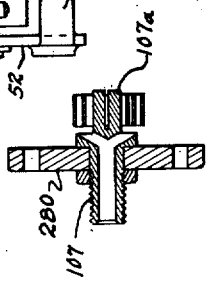
FIG. 12 is a vertical section of the cap and thermostatic coil of FIG. 11.

In order to coordinate displacements of the valve 37 with similar displacements in the fuel metering system which it controls, an air adjustment is provided in the form of a by-pass 80 (FIG. 8) and an adjustable metering screw 78 (see also FIG. 11). By adjusting the screw 78, indication of the air valve 37 to the rate of air flow can be changed to suit the calibration of the metering means for fuel which it controls.

As explained above, the calibration of the spring 43 is such that the angular position assumed by the valve 37 is proportional to the rate of air flow through the air conduit body B. Preferably, the pressure drop required to precisely position the valve 37 is held to a maximum of eight or ten inches of water pressure drop across the valve.

ENGINE LOAD AND TEMPERATURE SENSING DEVICE

Located below the throttle 50 in FIG. 9 is shown a port 116 in the wall of the conduit B connected by a series of passages 84 (see FIG. 8 and FIG. 18) with a cylinder 83 below a piston 82 in the cylinder. The cylinder 83 opens at its upper end into chamber 102, which, in turn, is provided with a connection 103 from a source of heat on the engine, as will later be more fully described. Within the chamber 102 is a thermostat enrichment coil spring 76. The inner end of the thermostat enrichment coil has a diametrically extending end 222 (shown in FIG. 19) secured in a slotted stud 223 integral with cover plate 224 enclosing chamber 102. The clamp and screw arrangements 225 frictionally hold the cover 224 in any adjusted position, and the cover 224 is provided with indexing means 226 to indicate its relative position on the chamber and the adjusted tension on the thermostat enrichment coil 76.

Figure 18:
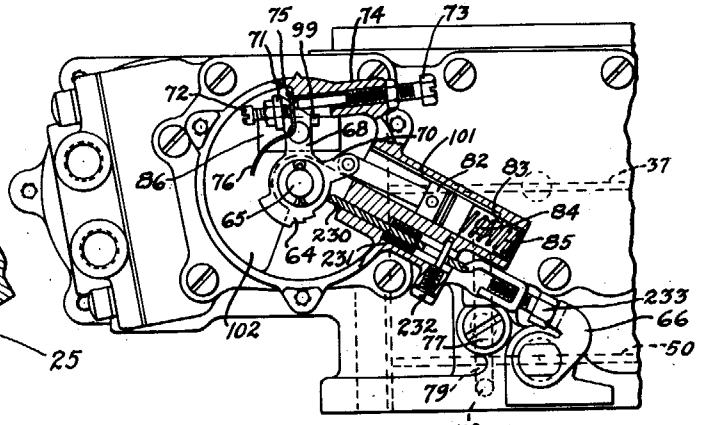
FIG. 18 is a fragmentary side elevation with parts removed and in section along the line 18—18 of FIG. 8.
Figure 19:
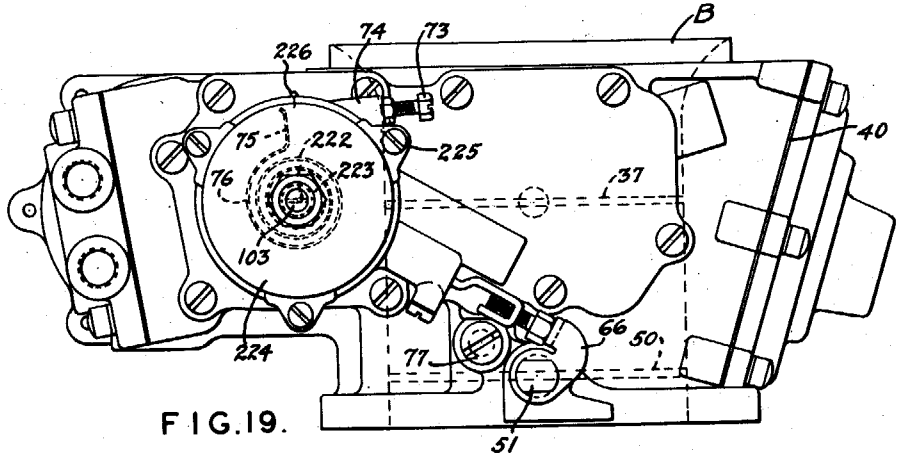
FIG. 19 is an end elevation of the structure in FIG. 8 as viewed from the bottom of the drawing towards the top.

The difference in pressure on opposite sides of the piston 82 during the engine operation at idle and normal cruising speeds of the vehicle causes the piston to assume the position shown in FIG. 18, for example, compressing the spring 85 beneath the piston. This pressure difference also causes a continual flow of air from a source of heat through the connection 103 into the thermostat chamber enclosing the thermostat coil 76 past the piston, through the by-pass 101, and into the conduit B by way of the passages 84.

Movements of the piston 82 in response to the opposing forces of spring 85 in one direction and suction in the opposite are communicated through a connection with a lever 70 to a shaft 65 carrying a lever 68 with an offset lug 99. The outer end of the thermostat enrichment coil 76 has a radially directed end which, at normal operating temperatures of the engine, moves into abutting relation with the inner end of screw 72 and the inner end of screw 73 threadedly mounted within a fixed portion 74 in the wall of the chamber structure.

This structure forms a sensing means connected with the air conduit B which will indirectly indicate by position of the shaft 65 the amount of load under which the engine is operating, or both load and temperature, all in a manner described heretofore.

Shaft 65 carries a fast idle cam 64 which cooperates, through a push rod mechanism 230, with a finger 66 secured to the manually operated throttle shaft 51. Around the rod 230 is a spring 231 constantly urging the rod outwardly, away from the cam 64. A pin 232 mounted in the housing has an end projecting through a slot in the pin 230 to limit its travel in either direction. Suitable adjustment is provided in the length of the push rod 230 by an adjusting screw 233 in abutting relation with the finger 66. When the throttle is open, the pin is urged outwardly, away from the cam 64, so as not to interfere with the action of the sensing means on the position of the shaft 65. Positions of the shaft 65 will indicate the variables of load and temperature and transmit these indications through a magnetic clutch 86 (shown in FIG. 8) having magnets disposed on opposite sides of a non-magnetic wall in the closed chamber C containing the datum pressure control metering.

Figure 13:
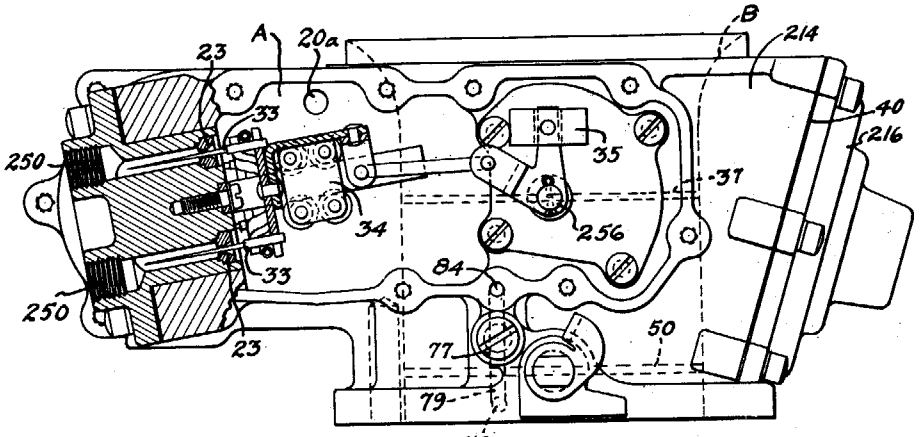
FIG. 13 is a side elevation taken substantially on line 13—13 in FIG. 8 with parts broken away and in section to illustrate details of the construction.
Figure 15:
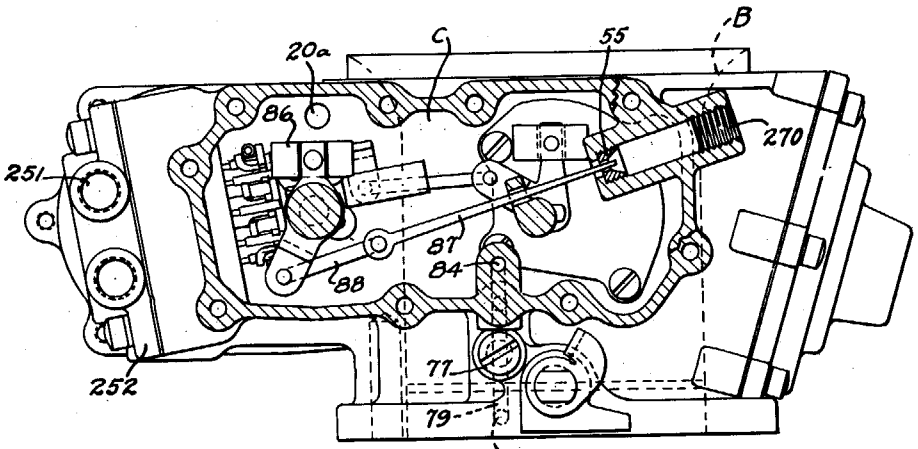
FIG. 15 is a side elevation with parts in section along the line 15—15 of FIG. 8.

The passages 79 and 84 have a common outlet 116, but the flow through passage 79 is separately regulated by a metering screw 77 (as shown in FIGS. 13, 15 and 18) by which the amount of air by-passing the throttle can be manually adjusted. The effect produced by adjustments of screw 77 will correspond in function with the ordinary mixture regulation screw in the conventional carburetor.

STRUCTURAL FORM OF THE FUEL METERING SYSTEM

Charging fuel metering.—The fuel metering mechanism is contained within two communicating but enclosed chambers A and C. The fuel supply for the metering part A is connected to a filter chamber 240 at the threaded connection 20 (as shown in FIG. 8). As explained heretofore, the source of fuel pressure may be a pump, the output pressure of which is regulated by the mechanism indicated as 22. Within the regulator structure is a needle valve 22b controlled through a leverage by diaphragm 22c secured in place by a cap 241 and suitable screws 242. The cap of the regulator contains a spring 22d which acts in opposition to fuel pressure beneath the diaphragm 22c. Regulator 22 is preferably adjusted to deliver about twenty-five pounds of pressure to the fuel metering parts A and C. Passages 20a connect the chamber A of the fuel metering part and the chamber C of the fuel metering part with the pressure regulator 22 (as shown in FIGS. 13 and 15, respectively.

Within the fuel metering chamber A is a fuel charge control mechanism for an eight-cylinder engine comprising eight metering orifices 23 receiving eight contoured metering rods 33 mounted on a carriage 34 for movement within the metering orifices 23. Each orifice separately controls the flow to eight separate fuel charging lines 24 which are connected with outlets 250 and 251 contained in the removable cap 252. Each separate fuel charging line 24 is, in turn, connected to an individual fuel nozzle 25 (as shown in FIG. 20) by way of the threaded connection 260. Preferably, there are as many metering orifices 23, metering rods 33, and fuel charging lines 24 connecting with nozzles 25 as there are cylinders in the internal combustion engine.

The position of the carriage 34, and consequently the position of the metering rods 33, is determined by the position of shaft 36 through the magnetic clutch 35 (as shown in FIG. 8). Each of the clutch elements consists of a small horseshoe magnet mounted for arcuate movement around concentrically located shafts such as 36 and 256 (shown in FIG. 13). Opposite poles of the magnets will be held adjacent by the force of attraction exerted through the non-magnetic removable plate 266 which lies between the adjacent magnets of clutch 35 and encloses the fuel chamber A.

Datum pressure metering.—Within the fuel metering part C is a metering orifice 55 (as shown in FIG. 15) controlled by a metering rod 87. The position of this rod within the orifice determines the rate of flow from the chamber C to a distributing system for datum pressure. This circuit has already been described as including a plurality of lines interconnecting outlet 270 with each of the fuel nozzles 25 through a suitable threaded connection 269 (as shown in FIG. 20).

Pressure in the distributing circuit for datum control is increased or decreased, as the case may be, by adjusting the area of the orifice 55 by the rod 87. The larger the area of the orifice, the greater will be the datum pressure, and vice versa.

In order to avoid the friction inherent in pressure seals of one form or another, the position of the needle 87 is controlled by a magnetic clutch 86 (shown in FIG. 8), which has oppositely located magnets separated by the non-magnetic wall 280 sealing the chamber C. One of these magnets is carried on arm 69 of shaft 65 concentrically arranged with shaft 281 in FIG. 17. The position of the shaft 65 controls the position of the rod 87, which, in turn, determines the size of the metering orifice 55, and thereby the pressure in the distributing system for datum pressure.

STRUCTURAL FORM OF ENGINE TEMPERATURE AND DE-ICING CIRCUIT

As shown in FIG. 8, air for this circuit enters by way of a port 111 in the top of the air conduit body B and travels by way of the passage 111 (shown in FIG. 11) into a thermostat chamber 106. Within the chamber is a thermostat coil 105 for operating a valve 114 controlling a by-pass passage 112. The outlet of this passage is shown in FIG. 9 entering the heating passage 113 within the flange 201 of the air conduit body B. Chamber 106 has a cover shown in FIG. 12 and indicated as 280 within which is secured a nipple 107. A slotted projection 107a secured to the nipple receives a diametrically extending inner end of the thermostat coil 105. Suitable holes are provided in the cover for securing it to the main air conduit body B.

Chamber 106 is connected by 107 with a suitable heater located in the water jacket or exhaust manifold, as the case may be, and the air passing through the heater is connected by way of a suitable threaded connection 110 (FIG. 9) with the heating passage 113. A branch 103 extends to the chamber 102 containing the thermostatic enrichment coil 76. Suction posterior of the throttle communicates with the chamber 102 by way of the passage 84 and the by-pass 101 in the cylinder 83. The operation of the load and temperature sensing means has already been described and will not be repeated here except to emphasize that its temperature response is effected by an engine temperature source in the manner above described.

Passage 113, which also receives heated air, as explained, is located adjacent the throttle 50 in the air conduit body B and discharges through a port 115 at the edge of the throttle.

THROTTLE CONTROL SWITCH FOR FUEL CHARGE UNLOADER

The end of the throttle shaft 51 in FIG. 11 carries an arm 98 integral with throttle lever 52, which moves as the throttle is opened to contact and close a switch 97, in substantially the wide-open throttle position. On the switch is a terminal 297 to which is connected the lead 96 of the circuit shown in FIG. 1. The body of the switch is connected to ground through the engine induction system upon which the air conduit body B is mounted. When the switch is closed, the circuit is completed from the line 96 to ground through the engine.

In FIG. 9 is shown a connection 300 which leads to a spark port such as is conventional practice in the carburetor art, which port opens anterior of the throttle. The usual automatic vacuum controlled spark advance may be connected at 300.

ADJUSTMENT AND CALIBRATION

In the system described, the metering rods 33 have certain limits of movement within the orifices 23 corresponding to the limits of angular movement for valve 37. Because of this feature and operation of the system at a selected pressure drop across orifices 23, calibration of the fuel metering is simplified.

All engine manufacturers determine the exact fuel requirements of their engines by test, and the results of these tests are represented by curves plotting fuel ratio against engine speed. One curve represents part-throttle fuel requirements or mixture ratio over the range of engine speeds at light load, such as to develop the power required at cruising speeds for an automobile. The other curve represents mixture ratio at full throttle throughout the range of engine speeds to develop full engine power. These curves are, generally speaking, parallel through a substantial range of engine speeds. Consequently, it is the usual practice to calibrate the metering for the full-throttle curve with the step-up in action or effective. A suitable part-throttle curve is obtained with the step-up out of action.

This procedure applies to the present system. Metering rods 33 are first calibrated at a constant pressure drop to produce a varying rate of flow within the limits of their movement, which rate, when plotted, forms a curve corresponding in shape with the full throttle curve of the engine.

After rods 33 are properly profiled to give a rate curve shaped like the full throttle curve, then the pressure drop necessary to give the correct total flow required can be approximated. From this the range in sizes for metering rod 87 can be derived, and these applied by tapering the rod to include the entire range.

With this procedure completed, precise adjustments can be made in the fuel metering during engine operation. Referring to FIGS. 1 and 2, any fixed adjustment of screw 73, in turn, fixes the upper rich limits of the open throttle curve by adjustment of the limit of travel of rod 87 into orifice 55 to give the maximum pressure drop across orifices 23. For any given adjustment of screw 73, the adjustment of screw 72 will fix the lower lean limits for the part-throttle curve by limiting travel of rod 87 out of orifice 55 to give the minimum pressure drop at orifices 23.

Actually, adjustments of the screw 73 result in raising and lowering both the full and part-throttle mixture curves produced by those portions of the metering rods 33 having the same flow coefficient. Expressed another way, this adjustment changes the mixture quality delivered at part-throttle and full-throttle, and maintains a constant difference in mixture quality.

If the flow coefficient varies at the idle end of the curve, which is possible, then adjustment of fuel flow can be made by screw 78 to effect desired compensation.

Adjustments of the screw 72 result in varying differences between the two curves for mixture quality.

The above description of the action of the adjusting screws 72 and 73 on the datum pressure metering rod, and this, in turn, on pressure drop across orifices 23, will, of course, depend upon the pressure setting of datum discharge valve 60. This valve is preferably set to open initially at a lower pressure than the setting for the pressure regulator 22—for example, 18 to 20 pounds gauge pressure. With this setting of valve 60, rod 87 has primary control of datum pressure during engine and pump operation. However, when the engine and pump stop, spring 85 expands, opening orifice 55. Pressures throughout the whole system will then equalize and gradually reduce to correspond with the pressure setting for initially opening valve 60. The balance in pressures cuts off the fuel flow in the engine charging circuit, and the valve 60 retains a substantial pressure to prevent vapor accumulation even at high under-hood temperatures.

Certain structures have been described herein which will fulfill all the objects of the present invention, but it is contemplated that other modifications will be obvious to those skilled in the art which come within the scope of the invention as defined by the appended claims.

I claim:

1. In a fuel metering device for an internal combustion engine, the combination with a fuel passage connected with said engine, a variable area fuel metering orifice in said passage, and a pump for delivering fuel through said orifice to the engine, of means for regulating the pressure downstream of said orifice to maintain across said orifice a fluid pressure drop which is independent of, and not affected by, changes in engine speed, and a sensing means responsive to the rate of air flow to said engine for varying the area of said orifice with changes in air flow to the engine.

2. In a fuel metering device for an internal combustion engine, the combination with a fuel passage connected with the engine, a variable area fuel metering orifice in said passage, and a pump for delivering fuel through said orifice to the engine, of means for regulating the pressure downstream of said orifice to maintain across said orifice a fluid pressure drop which is independent of, and not affected by, changes in engine speed, and a sensing means responsive, at least in part, to throttle opening for varying the area of said orifice with changes in the rate of air flow to the engine.

3. In an engine charge forming system having an air conduit supplying air to the engine, a fuel passage connected with said engine, a variable area fuel metering orifice in said passage, and a pump for delivering fuel through said orifice to the engine, the combination of means for regulating the pressure downstream of said orifice to maintain across said orifice a fluid pressure drop which is independent of engine speed, and sensing means in said air conduit including a pivoted vane angularly positioned in response to the rate of air flow through said conduit by a substantially constant pressure differential across the vane connected to vary the area of said orifice as with changes in air flow to the engine.

4. In a fuel metering device for an internal combustion engine, the combination with a fuel passage connected with said engine, a variable area fuel metering orifice in said passage, and a pump for delivering fuel through said orifice to the engine, of means for regulating the pressure downstream of said orifice to maintain across said orifice a fluid pressure drop which is independent of, and not affected by, changes in engine speed, and a sensing means responsive in part to engine speed and in part to throttle opening for varying the area of said orifice with changes in air flow to the engine.

5. In a fuel metering device for an internal combustion engine, the combination with a fuel passage connected with said engine, a variable area fuel metering orifice in said passage, and a pump for delivering fuel through said orifice to the engine, of means for regulating the pressure downstream of said orifice to maintain across said orifice a fluid pressure drop which is independent of, and not affected by, changes in engine speed, a sensing means responsive in part to engine speed for varying the area of said orifice with changes in air flow to the engine, and an engine load sensing means for said regulating means for increasing the pressure drop across said orifice.

6. In a fuel metering device for an internal combustion engine having a throttle controlled air intake, the combination with a fuel passage connected with said engine, a variable area fuel metering orifice in said passage, and a pump for delivering fuel through said orifice to the engine, of means for regulating the pressure downstream of said orifice to maintain across said orifice a fluid pressure drop, which pressure drop is independent of, and not affected by, changes in engine speed and throttle openings, and a sensing means responsive to indicate rate of air flow for adjusting the area of said orifice as a desired function of at least one of said variables.

7. In a fuel metering device for an internal combustion engine having a throttle controlled air intake, the combination with a fuel passage connected with said engine, a variable area fuel metering orifice in said passage, and a pump for delivering fuel through said orifice to the engine, of means for regulating the pressure downstream of said orifice to maintain across said orifice a fluid pressure drop which is independent of, and constant with respect to such variables as changes in engine speed and throttle openings, a sensing means responsive to indicate rate of flow and throttle openings for adjusting the area of said orifice as a desired function of airflow, and engine load sensing means for said regulating means for increasing the pressure drop across said orifice.

8. In a fuel metering device for an internal combustion engine, the combination with a plurality of independently operating fuel passages for connection with the engine, an orifice in each of said passages, and a pump delivering fuel through said orifices to supply the engine through said passages, of means for varying the areas of said orifices calibrated at a constant pressure drop across said orifices to deliver fuel in proportion to the air flow to provide fuel-air ratios required by the engine throughout its speed range, and means in said device for selecting the degree of pressure drop across said orifices including a pressure regulator means for maintaining constant the pressure drop selected.

9. In an engine charge forming system, the combination with an air conduit for engine charging air, a plurality of independently operating fuel passages for engine charging fuel, an orifice in each of said passages, and a pump delivering fuel through said orifices to supply the engine through said passages, of means for varying the area of said orifices calibrated at a constant pressure drop across said orifices to deliver fuel in proportion to the air flow to provide fuel-air ratios required by the engine throughout its speed range, means responsive, in part to engine speed for controlling changes in orifice areas, pressure regulator means in said passages, and means to adjust said pressure regulator means to control the pressure drop across said orifices and thereby the rate of fuel flow to suit the fuel-air ratio requirements throughout the range of engine speeds.

10. In an engine charge forming system, the combination with an air conduit for engine charging air, a plurality of independently operating fuel passages for engine charging fuel, a variable area orifice in each of said passages, and a pump delivering fuel through said orifices to supply the engine, said orifices being calibrated at a constant pressure drop across said orifices to deliver fuel in proportion to the air flow to provide fuel-air ratios required by the engine throughout its speed range, means responsive, in part to engine speed for controlling changes in orifice areas, pressure regulator means in said system for selecting the degree of pressure drop across said orifices and thereby the rate of fuel flow to suit the fuel-air ratio requirements throughout the range of engine speeds, and means associated with said pressure regulator means for maintaining constant the pressure drop selected.

11. In an engine charge forming system, the combination with an air conduit for engine charging air, a fuel passage for engine charging fuel, an orifice in said passage, and a pump delivering fuel through said orifice to supply the engine, of means for varying the area of said orifice calibrated at a constant pressure drop across said orifice to deliver fuel in proportion to the air flow to provide fuel-air ratios required by the engine throughout its speed range, means responsive in part to engine speed controlling the changes in orifice area, means in said device for selecting the degree of pressure drop across said orifice and thereby the rate of fuel flow to suit the fuel-air ratio requirement thoughout the range of engine speeds, means controlled by said device for maintaining constant the pressure drop selected, and means for sensing changes in engine load to vary the pressure drop selected.

12. In a fuel metering device for an internal combustion engine having a throttle controlled air intake, the combination with a fuel passage for connection with the engine, an orifice in said passage, and a pump delivering fuel through said orifice to supply the engine, of means for varying the area of said orifice calibrated at a constant pressure drop across said orifice to deliver fuel in proportion to the air flow to provide fuel-air ratios required by the engine throughout its speed range, means for regulating the pressure downstream of said orifice to maintain across said orifice a fluid pressure drop which is independent of engine speed, and a sensing means responsive, at least in part, to changes in engine speed for varying the area of said orifice as a desired function of engine speed.

13. In a fuel metering device for an internal combustion engine, the combination with a fuel passage for connection with the engine, an orifice in said passage, and a pump delivering fuel through said orifice to supply the engine, of means for varying the area of said orifice calibrated at a constant pressure drop across said orifice to deliver fuel in proportion to the air flow to provide fuel-air ratios required by the engine throughout its speed range, a sensing means responsive to airflow to the engine for varying the area of said orifice, a manual adjustment for selecting the degree of pressure drop across said orifice to obtain a rate of fuel delivery at one engine speed conforming to that required to obtain proper mixture for the rate of airflow indicated by said sensing means, and a pressure responsive device for maintaining constant the pressure drop selected.

14. In an engine charge forming system having an air conduit supplying air to the engine and a pressurized source of fuel for supplying the engine, the combination of sensing means connected with the engine for indicating engine fuel requirements, a fuel metering orifice between said source and the engine, and means connected with and containing fuel under a pressure proportional to the source of fuel supply to said orifice and responsive to indications of said sensing means for selecting the degree of fuel pressure drop across said orifice to determine the rate of fuel fed to the engine, including means regulating the flow through said orifice controlled by said selecting means or maintaining constant the degree of fuel pressure drop selected regardless of fuel pressure fluctuations at the fuel pressure source.

15. In an engine charge forming system having an air conduit supplying air to the engine and a pressurized source of fuel for supplying the engine, the combination of sensing means connected with the engine and rotatable to different angular positions for indicating engine fuel requirements in response to changes in engine load and engine temperature, a fuel metering orifice in said fuel supply, and means connected with and containing fuel under a pressure proportional to the source of fuel supply to said orifice and responsive to different angular positions of said sensing means for selecting the degree of fuel pressure drop across said orifice to determine the rate of fuel fed to the engine, said last means including means regulating the flow through said orifice controlled by said selecting means for maintaining constant the degree of fuel pressure drop selected regardless of fuel pressure fluctuations at the fuel pressure source.

16. In an engine charge forming system having an air conduit supplying air to the engine and a pressurized source of fuel for supplying the engine, the combination of means for sensing certain engine variables including engine temperature to indicate engine fuel requirements, a variable metering orifice in said fuel supply, means for controlling said orifice in response to indications of one of said variables, and means connected with and containing fuel under a pressure proportional to the source of fuel supply to said orifice and responsive to the indications of other of said sensing means including said temperature sensing means for selecting the degree of fuel pressure drop across said orifice to determine the rate of fuel fed to the engine, said last mentioned means including a flow regulating means for said orifice controlled by said selecting means for maintaining constant the degree of fuel pressure drop selected regardless of fuel pressure fluctuations at the fuel pressure source.

17. In an engine charge forming system having an air conduit supplying air to the engine and a pressurized source of fuel for supplying the engine, the combination of sensing means connected with the engine for sensing certain engine variables of engine operation indicating engine fuel requirements, including engine temperature and engine load, an indicator connected to said sensing means and positioned by opposing forces exerted by said sensing means, a fuel metering orifice in said fuel supply, and means connected with and containing fuel under a pressure proportional to that at the source of fuel supply to said orifice and responsive to the position of said indicator for selecting the degree of fuel pressure drop across said orifice to determine the rate of fuel fed to the engine, said last means including a flow regulating means for said orifice controlled by said selecting means for maintaining constant the degree of fuel pressure drop selected regardless of fuel pressure fluctuations at the fuel pressure source.

18. In an engine charge forming system having a conduit supplying air to the engine and a pressurized fuel supply having a connection with the engine, the combination of sensing means associated with the engine for indicating engine fuel requirements, means for adjusting the rate of fluid flow to the engine from said fuel supply, a datum pressure circuit pressurized from said fuel supply, means in said circuit for varying the fuel pressure in said circuit in response to the indications of said sensing means and variations in fuel pressure in said supply, and means maintaining the fuel pressure in said connection proportional to datum pressure.

19. In an engine charge forming system having an air conduit supplying air to the engine and a pressurized source of fuel for supplying the engine including a pump, a fuel chamber, and a fuel distributing circuit supplied from said source, the combination of sensing means connected with the engine for indicating engine fuel requirements, a connection between said chamber and said fuel distributing circuit, a fuel metering orifice in said connection, a by-pass circuit connected to said chamber and said system anterior to said pump, flow control means for said by-pass circuit in said chamber for selecting the degree of fuel pressure drop across said orifice to determine the rate of fuel fed to the engine, flow regulating means for said orifice controlled by said selecting means for maintaining constant the degree of fuel pressure drop selected regardless of fuel pressure fluctuations at the pressure source, and a magnetic clutch for transmitting indications of said sensing means outside said chamber to said flow control means inside said chamber.

20. In an engine charging system in combination, an air passage having a plurality of branches serving the engine cylinders, a throttle means controlling the flow of air through said passage, a fuel passage having an outlet in each of said branches, hydraulically controlled valve means for regulating the flow of fuel from each of said outlets, means responsive in part to engine speed hydraulically connected to urge said means open, and means responsive to air pressure changes in said air passage downstream of said throttle means and hydraulically connected to urge said valve in a closing direction.

21. In an engine changing system in combination, an air passage having a plurality of branches serving the engine cylinders, throttle means controlling the flow of air through said passage, a fuel passage having an outlet in each of said branches, hydraulically controlled valve means for regulating the flow of fuel from each of said outlets, means responsive at least in part to throttle movement hydraulically connected to urge said valve means open, and means responsive to air pressure changes in said air passage downstream of said throttle means and hydraulically connected to urge said valve in a closing direction.

22. In an engine charging device, in combination, an air passage, throttle means controlling the flow of air through said passage, a fuel passage, valve means actuated solely by fuel pressure for controlling the flow of fuel therethrough, means responsive to the air flow in said air passage hydraulically connected to said valve means, and means responsive to air pressure changes in said air passage downstream of said throttle means hydraulically connected to said valve means and effective upon increase in air pressure to operate said valve means to increase the flow of fuel through said passage.

23. A device for supplying fuel to an engine comprising an air supply passage, a throttle in the passage for controlling the supply of air, a fuel pump, a connection for supplying fuel from the pump to the engine, a valve for varying the fuel supplied through the connection, means for urging said valve in a direction to increase the fuel supply with a force which increases with increase in air flow to the engine, means for urging said valve in a direction to decrease the fuel supply with a force that is contant with respect to said first force and independent of fuel flow to the engine, whereby substantially constant fuel-to-air proportioning is maintained, and means for modifying one of said forces under certain conditions of engine operation for varying the proportions of fuel and air supplied to the engine.

24. In a charge forming system for an internal combustion engine having a plurality of cylinders each with an air intake pipe, a fuel system comprising a fuel distributing circuit, means for regulating the total fuel flow and for feeding said fuel under pressure to said fuel circuit, a fuel discharge valve for discharging fuel into each air intake pipe, each of said valves having its inlet side connected to said fuel distributing circuit and being adapted to continuously discharge fuel therefrom into an associated air intake pipe, valve operating means for each of said valves, each said valve operating means having one side responsive to the pressure of the fuel applied to the inlet side of its associated valve for urging said valve in an opening direction, liquid passage means interconnecting the opposite sides of said valve operating means, and means for maintaining a predetermined controlled fluid pressure in said liquid passage means acting with equal force on each of said valves whereby uniform fuel flow is obtained from each of said valves.

25. In an induction system for an internal combustion engine, the combination of a throttle controlled air passage leading to said engine, a passage supplied with fuel at pump pressure, a charging fuel distributing circuit supplied from said fuel passage and delivering fuel to said air passage, a variable area orifice in said fuel passage and a pressure regulating means to maintain across said orifice a pressure drop which is independent of engine speed including a second fuel distributing circuit supplied from said fuel passage, means for establishing a datum fuel pressure in said second distributing circuit proportional to that in said fuel passage, a fuel flow regulating valve controlling the discharge from said charging fuel distributing circuit and regulated by oppositely acting fuel pressures through connections with said charging fuel distributing circuit pressure and datum pressure, and sensing means responsive in part to engine speed changes for varying the area of said orifice as a desired function of air flow through said air passage.

26. In an induction system for an internal combustion engine, the combination of a throttle controlled air passage leading to said engine, a passage supplied with fuel at pump pressure, a charging fuel distributing circuit supplied from said fuel passage and delivering fuel to said air passage, a variable area orifice in said distributing circuit and a pressure regulating means to maintain across said orifice a pressure drop which is independent of engine speed, including a second fuel distributing circuit supplied from said fuel passage, means for establishing a datum fuel pressure in said second distributing circuit proportional to that in said fuel passage, a fuel flow regulating valve controlling the discharge from said charging fuel distributing circuit and regulated by oppositely acting fuel pressures through connections with said charging fuel distributing circuit pressure and datum pressure, and sensing means responsive at least in part to throttle opening for varying the area of said orifice as a desired function of air flow to the engine.

27. In a charge forming system for an internal combustion engine having a plurality of cylinders, each with an air intake pipe leading from a common inlet, a fuel supply system having a pressurized source of fuel, and a distributing circuit for engine charging fuel leading from said source and discharging into each intake pipe, the combination of variable area fuel metering orifice means for said circuit for engine charging fuel, a sensing means in said inlet for indicating the rate of air flow to the engine, means for varying the area of said orifice means in response to indications of said sensing means, means for sensing varying fuel requirements of the engine at different loads and engine temperatures, a datum pressure distributing circuit, means for maintaining a pressure in said datum circuit porportional to that in said distributing circuit for engine charging fuel, means for varying the datum pressure in response to indications of said second sensing means, and means for controlling the discharge of fuel through said variable orifice means, comprising valve means downstream from said variable orifice means responsive to the difference in pressures between the distributing circuit for engine charging fuel and the distributing circuit for datum pressure.

28. In a fuel flow regulating means for an engine induction system comprising in combination a common source of fuel, a main discharge conduit leading from said source to a plurality of branch conduits, and outlet for each branch conduit in the engine induction system, a fuel pump in said main conduit, a variable restriction in each of said branch conduits, a valve in each of said branch conduits downstream from its associated restriction, operating means for each valve including a pair of chambers separated by a movable wall, means connecting one of each of said pairs of said chambers to its associated branch conduit between the restriction and the valve therein so that the pressure in said one chamber acts on said wall in a valve opening direction; a by-pass conduit connected to said main discharge conduit and the inlet to said pump, means for establishing a datum pressure in said by-pass conduit proportional to the pressure in said main conduit, means connecting the other chambers of all of said operating means to said by-pass conduit so that the valves are operated to maintain equal pressures on the downstream sides of all said variable restrictions, and means responsive to an engine operating condition for controlling all of said variable restrictions.

29. A fuel distributing apparatus for an engine charging system comprising in combination, an air induction system leading from a common inlet to each of a group of the cylinders of the engine, a pump for supplying fuel under pressure, a main discharge conduit leading from said pump to a plurality of branch conduits, outlets for said branch conduits in the engine induction system, a fuel metering restriction for each of said branch conduits, a valve in each of said conduits downstream from its associated restriction, operating means for each of said valves including a pair of chambers separated by a movable wall operating each valve, one of each pair of said chambers being connected to its associated branch conduit between the restriction and the valve therein so that pressure in said one chamber acts on said wall in a valve opening direction, a by-pass conduit connected between said main discharge conduit and the inlet of said pump, means for establishing a datum fuel pressure in said by-pass conduit, said means including a variable restriction at the inlet of said by-pass conduit and a flow restriction at the outlet of said by-pass conduit, means connecting the other chambers of all of said valve operating means to said by-pass conduit between said restructions so that the valves are operated to maintain equal pressures on the downstream sides of all of said fuel metering restrictions, and means responsive to an engine operating condition to operate said variable restrictions and thereby vary the flow uniformly through each of said valves.

30. In an engine charge forming system having an air conduit supplying air to the engine and a pressurized source of fuel to supply the engine, the combination of means for sensing certain engine variables including engine temperature and engine load, a movable indicator connected to said sensing means and positioned by the balanced reaction of opposing forces exerted by said sensing means on said indicator, and means for regulating the fuel pressure for supplying the engine controlled by positions of said indicator.

31. In an engine charge forming system having an air conduit supplying air to the engine and a pressurized source of fuel for supplying the engine, the combination of two means for sensing certain engine variables, an indicator connected to both said sensing means and positioned by opposing forces exerted by said sensing means, a variable lost motion connection between one of said sensing means and said indicator, and means for regulating the flow of fuel for supplying the engine controlled by positions of said indicator.

32. In an engine charge forming system having an air conduit supplying air to the engine and a pressurized source of fuel for supplying the engine, the combination of means for sensing certain engine variables including engine temperature and engine load, an indicator connected to said sensing means and positioned by opposing forces exerted by said sensing means, a variable lost motion connection between one of said sensing means and said indicator, a device for adjusting the effect of said temperature sensing means on said indicator in the normal range of engine operating temperatures, and means for subsequently controlling the flow of fuel for supplying the engine in response to the positioning of said indicator by changes sensed in engine load.

33. In an engine charge forming system having an air conduit supplying air to the engine, a fuel passage connected with said engine, a variable area fuel metering orifice in said passage, and a pump for delivering fuel through said orifice to the engine, the combination of a sensing means for indicating the rate of air flow in said air conduit comprising a pivoted vane angularly positioned in response to a substantially constant air pressure differential across the vane connected to vary the area of said orifice, and means providing for adjustment of these angular indications of the vane in response to rate of air flow, including an air by-pass around said vane, and means for adjusting the flow through said by-pass.

34. An engine charge forming system having an air conduit supplying air to the engine, a throttle valve therein, and a pressure source of fuel, a fuel nozzle supplied from said source and discharging into said engine and valve means between said source and said nozzle, and an actuator for said valve means operated in response to opening movement of said throttle for closing said valve means when the engine is cranked, to reduce fuel delivery from said nozzle.

35. An engine charge forming system having a throttle controlled air conduit supplying air to the engine, a fuel pressure source, a differential pressure operated fuel nozzle discharging into said engine, an engine charging distributing circuit connecting said source with said nozzle, a datum pressure distributing circuit connecting said source and said nozzle, and valve means in said datum pressure distributing circuit closed by opening movement of said throttle for increasing said datum pressure to reduce the discharge of fuel from said nozzle when the engine is cranked.

36. An engine charge forming system having a throttle controlled air conduit supplying air to the engine, a fuel pressure source, a differential pressure operated nozzle discharging into said engine, an engine charging distributing circuit connecting said source and said nozzle, a metering means for said distributing circuit to measure the flow therethrough, a datum pressure distributing circuit connecting said source and said nozzle, and a valve in said datum pressure distributing circuit closed by opening of said throttle for increasing the datum pressure to reduce the discharge from said nozzle below the metered rate when the engine is cranked.

37. An engine charge forming system for use on an internal combustion engine having a starter motor, a power source for said motor, and a control means between said source and said motor for energizing the motor to crank the engine, said system comprising, in combination, a throttle controlled air conduit supplying air to the engine, a fuel pressure source, a differential pressure operated nozzle discharging into said engine, an engine charge distributing circuit connecting said source and said nozzle, metering means for said distributing circuit to measure the flow therethrough, a datum pressure distributing circuit connecting said source and said nozzle, and a valve in said datum pressure distributing circuit closed by opening of said throttle during cranking of the engine to increase the datum pressure to reduce the discharge from said nozzle below the metered rate.

38. In an engine charge forming system having a throttle controlled air conduit supplying air to the engine, a pressurized source of fuel for supplying the engine, fuel metering means in said fuel supply, and temperature responsive sensing means for varying the fuel flow through said metering means, the combination of means for operating said sensing means including a source of heat on said engine, a heating circuit between said source and said sensing means including a by-pass around said source of heat, means for causing a circulation of fluid through said circuit, and temperature responsive means for controlling the operation of said by-pass 39. In an engine charge forming system having a throttle controlled air conduit supplying air to the engine a pressurized source of fuel for supplying the engine, fuel metering means in said fuel supply, and engine temperature responsive sensing means for varying the fuel flow through said metering means, the combination of means for operating said sensing means comprising a source of heat on said engine, a heating circuit extending from said source through said air conduit adjacent said throttle to said sensing means, a by-pass for said heating circuit extending around said source of heat and discharging directly into said heating circuit in said air conduit, means for causing a circulation of fluid flow through said circuit and said by-pass, and temperature responsive means for controlling the operation of said by-pass.

40. An engine charge forming system comprising, in combination, an engine condition sensing means for sensing engine fuel requirements, indicator means positioned by the condition sensed by said sensing means, a fuel feeding device connected to the engine having a pressurized chamber, a fuel metering device in said chamber having a movable part for varying the quantity of fuel metered, a non-magnetic wall in said chamber adjacent said movable part and said indicator, and a magnetic clutch with magnetic elements connected to said movable part within said chamber and connected to said indicator means outside said chamber whereby said sensing means directly controls fuel metering.

41. In an engine charging system having an air conduit to supply air to the engine and a pump for supplying fuel to the engine, the combination of a device having a chamber supplied from said pump, means for proportioning the rate of fuel flow through said chamber to the rate of air flow to the engine through said conduit, and a flow divider receiving the fuel flow from said proportioning device and delivering the fuel at the rate received to a plurality of discharge points in the engine, comprising a plurality of fuel passages branching from said chamber for conducting the fuel to said points of discharge, a calibrated metering restriction in each of said branch fuel passages upstream of each of said points of discharge, a regulating valve in each fuel passage downstream of each metering restriction, said chamber being common to said fuel passages for maintaining the pressure upstream of said restriction substantially equal in all of said passages, a movable wall connected to each of said valves, each said wall being subject on one side thereof to the fuel passage in its associated fuel passage downstream of the restriction in said passage to apply force to said wall in a direction tending to open said valve, means for conducting a regulating fluid under positive pressure to the opposite side of each of said walls to apply equal forces in a direction tending to close each of said valves and thereby maintain the pressure downstream of said restrictions at a value proportional to the pressure of said regulating fluid to render the flow of fluid to said points of discharge equal and proportional to the equal drop across said restrictions, and means controlling the pressure of the regulating fluid so as to predetermine the fuel pressure downstream of each of said restrictions to eliminate the effect of pressure fluctuations downstream of said orifices on the rate of fuel flow at each of said points of discharge.

42. In an automatic flow regulating system for fluids, a fuel chamber adapted to receive and hold the fluid to be regulated under pressure, said fuel chamber having a plurality of conduits branching therefrom for conducting the fluid to points of discharge, a variable area metering restriction in each of said branch conduits upstream of each of said points of discharge, control means operative for simultaneously varying the flow areas of said metering restriction, an equalizing valve in each conduit downstream of each variable area metering restriction, said fuel chamber being common to said branch conduits for maintaining the pressure upstream of said variable area restrictions substantially equal for all conduits, a movable wall connected to each of said valves, each said wall being subjected on one side thereof to the pressure of fluid in its associated conduit downstream of the metering restriction therein, means for conducting a regulating fluid to the opposite side of each said wall, and means acting independent of said first mentioned control to maintain the regulating fluid under pressure proportional to said fuel chamber pressure to thereby maintain the pressure downstream of said variable area restrictions at a given value or values in all conduits and thereby render the flow of fluid to said discharge points proportional to the change in area of said metering restrictions.

43. A fuel distributing apparatus for a pressurized charge forming system of an engine having a plurality of combustion chambers comprising, in combination, an air induction system leading to each of the combustion chambers of the engine, a sensing means in said induction system for indicating the rate of airflow to the engine, a fuel chamber in the charge forming system containing the fuel under pressure to be regulated, a pump for supplying fuel under pressure to said fuel chamber, said fuel chamber having a plurality of conduits branching therefrom for conducting fuel to points of discharge communicating with the combustion chambers, a variable area metering restriction in each of said branch conduits upstream of the point of discharge thereof, control means actuated by said rate of airflow sensing means for simultaneously and equally varying the flow areas of said metering restrictions, an equalizing valve in each branch conduit downstream of the variable area metering restriction therein, said fuel chamber being common to said branch conduits for maintaining the pressure upstream of said variable area restrictions substantially equal for all conduits, a movable wall connected to each of said valves, each said wall being subjected on one side thereof to the pressure of fluid in its associated conduit downstream of the restriction in said conduit, means for conducting regulating fluid from said fuel chamber to the opposite side of each said wall, and means independent of said first mentioned control to maintain the regulating fluid under pressure proportional to said fuel chamber pressure to thereby maintain the pressure downstream of said variable area restrictions at a given value or values in all conduits and render the flow of fluid to said discharge points proportional to the change in area of said metering restrictions.

44. Fuel flow regulating means for an engine induction system comprising, in combination, a main discharge conduit leading to a plurality of branch conduits, an outlet for each branch conduit in the engine induction system, a fuel pump for supplying fuel under substantially constant pressure to said main discharge conduit, a fuel metering means of variable flow capacity in each of said branch conduits, engine operated means for varying the capacity of each of said fuel flow metering means simultaneously and equally, a valve in each of said branch conduits downstream from its associated metering means, operating means for each valve including a pair of chambers separated by a movable wall, means connecting one of each of said pairs of said chambers to its associated branch conduit between the restriction and the valve therein so that the pressure in said one chamber acts on said wall in a valve opening direction; a datum pressure system, means independent of said engine operated fuel flow metering means for establishing a datum pressure in said datum pressure system proportional to the pressure in said main discharge conduit and independent of said engine operated fuel flow metering means, and means connecting the other chambers of all of said valve operating means to said datum pressure system so that the valves are operated to maintain equal pressures on the downstream sides of all of said variable restrictions at a constant pressure drop relative to the pressure in said main discharge conduit so as to maintain equal flows in said branch conduits varying directly with changes in flow capacity of said fuel metering means.

45. In an engine charge forming system having a branched air conduit leading from a common air inlet to each of a group of engine combustion chambers, the combination of a pump for supplying fuel under pressure, a distributing circuit for engine charging fuel supplied from said pump and including a fuel chamber with a plurality of branch conduits supplying fuel to said combustion chambers, a fuel metering restriction for each of said branch conduits, a metering rod in each of said restrictions, a rod carrier mounted for linear travel in said chamber for moving all of the rods within said restrictions to vary the area of said metering restrictions simultaneously and equally, airflow sensing means outside said fuel chamber drivingly connected to said carrier to vary the area of said metering restrictions proportional to the rate of airflow to the engine, a valve in each of said branch conduits downstream from its associated restriction, operating means for each of said valves including a pair of chambers separated by a movable wall, one of each pair of said chambers being connected to its associated branch conduit between the restriction and the valve therein so that pressure in said one chamber acts on said wall in a valve opening direction; a by-pass conduit around said pump, means for establishing a datum fuel pressure in said by-pass conduit, said means including a variable restriction at the inlet of said by-pass conduit and a flow restriction at the outlet of said by-pass conduit, means connecting the other chambers of all of said valve operating means to said by-pass conduit between said restrictions so that the valves are operated to maintain equal pressures on the downstream sides of all of said fuel metering restrictions, and means responsive to an engine operating condition to operate the variable restriction in said by-pass conduit and thereby vary the datum pressure and the flow through each of said valves.

46. The combination defined in claim 45 in which said flow restriction at the outlet of said by-pass conduit includes a pressure regulator for limiting the pressure drop in said datum pressure circuit to maintain said distributing circuit for engine charging fuel under pressure when said pump is inoperative.

47. A fuel distributing apparatus for an engine charging system comprising, in combination, an air induction system leading to each of the cylinders of the engine, a pump for supplying fuel under pressure, a main discharge conduit leading from said pump to a plurality of branch conduits, outlets for said branch conduits in the engine induction system, a fuel metering restriction for each of said branch conduits, a valve in each of said branch conduits downstream from its associated fuel metering restriction, operating means for each of said valves including a pair of chambers separated by a movable wall, one of each pair of chambers being connected to its associated branch conduit between the restriction and the valve therein so that pressure in said one chamber acts on said wall in a valve opening direction, a datum pressure circuit including a by-pass conduit around said pump, means for establishing a datum fuel pressure in said by-pass conduit, said last-mentioned means including a flow restriction at the inlet of said by-pass, a datum metering rod in said restriction, a linearly movable carrier for moving the datum rod within said restriction at the inlet of said by-pass, a fixed flow restriction at the outlet of said by-pass conduit, means connecting the other chambers of all of said valve operating means to said by-pass conduit between said restrictions in said by-pass conduit so that the valves are operated to maintain equal pressures on the downstream sides of all of said fuel metering restrictions, and temperature operated sensing means drivingly connected to move said datum rod carrier and thereby vary the pressure drop across all of said fuel metering restrictions in accordance with changes in engine temperature.

48. In an engine charge forming system having a branched air conduit leading from a common air inlet, with a throttle, to each of a group of engine combustion chambers, the combination of a pump for supplying fuel under pressure, a distributing circuit for engine charging fuel supplied from said pump and including a fuel chamber with a plurality of branch conduits for supplying fuel to said combustion chambers, a fuel metering restriction for each of said branch conduits, a plurality of metering rods in said restrictions, a rod carrier mounted for linear travel in said fuel chamber for moving all of the rods within said restrictions to vary the areas of said metering restrictions simultaneously and equally, airflow sensing means outside said fuel chamber drivingly connected to said carrier to vary the areas of said metering restrictions proportional to the rate of airflow to the engine, a valve in each of said branch conduits downstream from its associated fuel metering restriction, operating means for each of said valves including a pair of chambers separated by a movable wall, one of each pair of chambers being connected to its associated branch conduit between the restriction and the valve therein so that pressure in said one chamber acts on said wall in a valve opening direction; a datum pressure circuit including a by-pass conduit around said pump, means for establishing a datum fuel pressure in said by-pass conduit, said last-mentioned means including a flow restriction at the inlet of said by-pass, a datum metering rod in said flow restriction, a linearly movable carrier for moving said datum rod within said flow restriction at the inlet of said by-pass, a second flow restriction at the outlet of said by-pass conduit, means connecting the other chambers of all of said valve operating means to said by-pass conduit between said restrictions therein so that said valves are operated to maintain equal pressures on the downstream sides of all of said fuel metering restrictions, and temperature and engine inlet suction operated sensing means drivingly connected to move said datum rod carrier and thereby vary the pressure drop across all of said fuel metering restrictions in accordance with changes in engine temperature and inlet suction.

49. The combination defined in claim 48 in which said flow restriction at the outlet of said by-pass conduit includes a pressure regulator for limiting the pressure drop in said datum pressure circuit to maintain said distributing circuit for engine charging fuel under pressure when said pump is inoperative.

50. The combination defined in claim 48 in which said flow restriction at the outlet of said by-pass conduit includes a pressure regulator for limiting the pressure drop in said datum pressure circuit to maintain said distributing circuit for engine charging fuel under pressure when said pump is inoperative, a valve in said datum pressure circuit located downstream from said means connecting the other chambers of all of said valve operating means with said by-pass conduit, and an actuating mechanism for closing said valve in response to opening movement of the throttle to unload the engine of fuel when the engine is cranked, and said pump operating, by raising the datum pressure and thereby reducing the fuel discharge by closing all of said valves in said branch conduits.

51. In an engine fuel charging system of the pressure type having a fuel inlet, a fuel outlet for discharging fuel to the engine, a pump supplying fuel under pressure to said inlet, and a fuel line normally pressurized from said pump connecting said inlet and outlet, the combination of means for maintaining said system completely pressurized regardless of operation of said fuel pump, comprising a datum pressure system, means establishing a controlled pressure in said datum system, a pressure regulator connected to said datum pressure system and having a valve in said fuel line adjacent said discharge outlet actuated by datum pressure to throttle the flow in said fuel line for maintaining the fuel in said line at a pressure related to the controlled pressure in said datum system, and means in said datum system for limiting the drop in pressure therein, regardless of decreases in pump pressure in said fuel line, whereby fuel line pressure is continuously maintained throughout the fuel charging system.

52. In an engine fuel charging system of the pressure type having an air induction conduit with a throttle, a fuel outlet for discharging fuel to said conduit, a fuel inlet, a pump supplying fuel under pressure to said inlet, and a fuel line normally pressurized from said pump connecting said inlet and outlet, the combination of a datum pressure system, means establishing a controlled pressure in said datum system, a pressure regulator connected to said datum pressure system and said fuel line having a valve adjacent said discharge point actuated by datum pressure to throttle the flow in said fuel line for maintaining the fuel in said line at a pressure proportional to the controlled pressure in said datum system, and means in said datum system responsive to opening movement of the throttle for increasing the datum pressure relative to fuel line pressure to thereby reduce the fuel discharge at said outlet to unload the engine during cranking.

53. In an engine fuel charging system of the pressure type having an air induction conduit with a throttle, a fuel outlet for discharging fuel to said conduit, a fuel inlet, a pump supplying fuel under pressure to said inlet, and a fuel line normally pressurized from said pump connecting said inlet and outlet, the combination of a datum pressure system, means establishing a controlled pressure in said datum system, a pressure regulator connected to said datum pressure system, said fuel line having a valve adjacent said outlet actuated by datum pressure to throttle the flow in said fuel line for maintaining the fuel in said line at a pressure proportional to the controlled pressure in said datum system, a first means in said datum system responsive to opening movement of the throttle for increasing the datum pressure relative to the fuel line pressure to thereby reduce the fuel discharge at said outlet to unload the engine during cranking, and second means in said datum pressure system for limiting the drop in pressure therein regardless of decreases in pump pressure in said fuel line, whereby fuel pressure in said line is continuously maintained throughout the charge forming system.

54. In an engine fuel charging system of the pressure type having a fuel inlet, fuel outlets for discharging fuel to the engine, a pump supplying fuel under pressure to said inlet, and a fuel line normally pressurized from said pump connected with said inlet and having a plurality of branches leading to said outlets, the combination of a variable capacity fuel metering restriction for each of said branches, a datum pressure system, means establishing a controlled pressure in said datum system, a valve for throttling the flow in each of said branches downstream of the metering restriction therein connected with and actuated by the datum pressure to maintain the fuel in said branches at a pressure related to the controlled pressure in said datum system, and pressure regulator means in said datum system for limiting the drop in pressure therein, whereby fuel line pressure is continuously maintained throughout the fuel charging system regardless of decreases in pump pressure in said fuel line.

55. In an engine charge forming system having a manifold for supplying air to the combustion chambers in the engine, the combination of a distributing system for engine charging fuel having discharge outlets in communication with the combustion chambers of the engine, a pressurized source of fuel for pressurizing said fuel distributing system to said discharge outlets, fuel metering means, including valve means in the outlets of said distributing system, responsive to engine operation for controlling the rate of fuel flow through said fuel metering means to the engine, thermostatic means causing said valve means to move in a direction tending to increase the rate of fuel flow through said fuel metering means to said engine at low temperatures and for urging said valve means in the opposite direction as temperatures increase, thereby tending to decrease the rate of fuel flow, and engine suction operated means connected to said manifold for acting on said valve means to modify the effect of said thermostatic means.

56. In an engine charge forming system having a manifold for supplying air to the combustion chambers in the engine, the combination of a distributing circuit for engine charging fuel having discharge outlets, communicating with the combustion chambers of the engine, a pressurized source of fuel for pressurizing said fuel distributing system to said outlets, fuel metering means in said distributing system including valve means responsive to engine operation for controlling the rate of fuel flow through said fuel metering means to the engine, thermostatic means hydraulically connected to said valve means causing said valve means to move in a direction tending to increase the rate of fuel flow through said fuel metering means to said engine at low temperatures and urging said valve in the opposite direction as temperatures increase, thereby tending to decrease the rate of fuel flow, and engine suction operated means connected to said manifold for acting on said thermostatic means in a direction tending to decrease the rate of fuel flow to the engine when the engine starts.

57. In a charge forming device for an internal combustion engine having an air conduit connected to the engine and a separate pressurized source of fuel connected to the engine so as to supply air and fuel under pressure to the engine through separate streams, the combination of a regulating system for maintaining the flow in said fuel stream proportional to the flow in said air stream, comprising a first variable capacity flow metering means in said air stream, a motor connected to said first flow metering means for changing the flow capacity thereof, a means sensitive to the pressure drop across said first flow metering means and connected to operate said motor in response to changes in static pressure drop sensed across said first flow metering means to increase the capacity of said first flow metering means when the pressure sensed exceeds a substantially fixed amount, and to decrease the capacity thereof when the pressure sensed decreases from the said amount, a second variable capacity flow metering means in said fuel stream operatively connected with said motor so that simultaneous changes in capacity occur in both of said first and second flow metering means which are proportional, and means to maintain a substantially constant pressure drop across said second flow metering means whereby the flow in said two streams is maintained proportional.

58. In a charge forming device for an internal combustion engine having an air conduit connected to the engine and a separate pressurized source of fuel connected to the engine so as to supply air and fuel under pressure to the engine through separate streams, the combination of a regulating system for maintaining the flow through said fuel stream proportional to the flow in said air conduit, comprising a first variable capacity flow metering means in said air conduit, a motor connected to said first flow metering means for changing the flow capacity thereof, a means sensitive to changes in the velocity of flow through said first flow metering means and connected to operate said motor in response to changes in the velocity of flow through said first flow metering means to increase the capacity of said first flow metering means when the velocity of flow sensed exceeds a substantially predetermined amount, and to decrease the capacity of said first flow metering means when the velocity sensed decreases from the said amount, a second variable capacity flow metering means in said fuel stream operatively connected with said motor so that simultaneous changes in flow capacity occur in both said flow metering means, and regulator means to maintain a substantially constant velocity of fuel flow through said second flow metering means.

59. In an engine charging device having an air conduit with an air inlet and air outlets connected with the combustion chambers of the engine and a fuel chamber receiving fuel under pressure and delivering the fuel through separate branches to the combustion chambers of the engine, a system for maintaining the fluid flow through said air conduit proportional to the fuel flow through said branches, comprising a first variable area orifice in said air conduit, a motor connected to said orifice for changing the area thereof, a means sensitive to changes in the rate of flow through said first orifice and connected to operate said motor in response to meter the amount of distributed fuel by by-passing the surplus amount of fuel from said distributor, means responsive to a pressure indicative of the quantity of air flowing through said induction system, a linkage operatively interconnecting said means with said valve for actuating said valve in proportion to said pressure, an enrichment device effective during only certain engine operating conditions to modify the action of said linkage to thereby modify the proportions of the air-fuel ratio and enrichen the charge during said conditions, and means for delivering excess fuel delivered by the pump to the inlet side of the pump.

69. A fuel injection system for an internal combustion engine having a plurality of cylinders and an induction system for charging said cylinders, said injection system comprising a fuel pump connected to a source of fuel and having an outlet for discharging fuel therefrom, a distributing chamber having one end thereof connected to said pump outlet and including a plurality of injector lines for distributing equal increments of fuel to said cylinders, a valve in the opposite end of said distributing chamber effective to meter the amount of fuel distributed through said injector lines by by-passing the surplus amount of fuel from said distributing chamber, a diaphragm responsive to an air pressure indicative of the quantity of air flowing through said induction system, a linkage operatively interconnecting said diaphragm with said valve for actuating said valve in proportion to said air flow, an enrichment device effective during only certain engine operating conditions to modify the effectiveness of said linkage to thereby modify the proportions of the air-fuel ratio of said charge during certain engine operating condtions.

70. A fuel injection system for an internal combustion engine having a plurality of cylinders and an induction system for charging said cylinders, said injection system comprising a distributing chamber having one end thereof connected to a source of pressurized fuel and a plurality of injector lines radiating therefrom for distributing equal increments of fuel to the charges for said cylinders, means responsive to the amount of air in said induction system, a by-pass valve effective to meter the amount of fuel distributed by regulating the amount of fuel by-passed, a linkage operatively interconnecting said means with said valve and including an adjustable fulcrum, and an enrichment device operative to adjust the position of said fulcrum.

71. A fuel injection system for an internal combustion engine having a plurality of cylinders and an injection system for charging said cylinders, said injection system comprising a pump having an output proportional to the speed of said engine, a distributing chamber having one end thereof connected to the outlet of said pump and having a plurality of injector lines radiating therefrom for distributing equal increments of fuel to the charges for said cylinders, a by-pass valve effective to meter the amount of fuel distributed by regulating the amount of fuel by-passed, pressure responsive means adapted to sense the pressure of the air in said induction system, a linkage operatively interconnecting said pressure responsive means with said by-pass valve and including an adjustable fulcrum, and an enrichment device operative to adjust the position of said fulcrum during certain engine operating conditions.

72. A fuel injection system for an internal combustion engine having a plurality of cylinders and an induction system for charging said cylinders, said injection system comprising a fuel pump having an outlet for discharging fuel under pressure therefrom, a distributor connected to said pump outlet for distributing equal increments of fuel to said cylinders, a valve for metering the quantity of said distributed fuel by by-passing at least a portion of the output of fuel from said pump, means responsive to the quantity of air flowing through said engine for actuating said valve to thereby control the volume of by-passed fuel and thus meter the fuel flowing from said distributo to said cylinders, a starting enrichment device effectiv during only the starting operation of said engine to mov said valve towards the closed position to thereby overrid the the normal metering action and thereby temporaril increase the proportion of fuel distributed from sai distributor to said cylinders.

73. A fuel injection system for an internal combustic engine having a plurality of cylinders and an inductic system for charging said cylinders, said injection syste comprising a fuel pump having an outlet for dischargi the fuel therefrom in proportion to the speed of said e gine, a distributor connected to the outlet of said pun and having a plurality of injector lines extending ther from for distributing equal increments of fuel to sa cylinders, a valve in said distributor for by-passing least a portion of the fuel from said distributor, mea responsive to the pressure of the air flowing through sa induction system for actuating said valve in proporti thereto to thereby meter the quantity of distributed fu in proportion to said air flow, a starting enrichme device effective only during the starting operation to bi said valve towards the close position to thereby increc the proportion of fuel distributed to said cylinders.

74. A fuel injection system for an internal combusti engine having a plurality of cylinders and an inducti system for charging said cylinders, said injecton syst comprising a distributing chamber having one end there connected to a source of pressurized fuel and a plural of injector lines radiating therefrom for distributing eq increments of fuel to the charges for said cylinde means responsive to the amount of air in said inducti system, a by-pass valve effective to meter the amount fuel distributed to said cylinders by regulating the amo of fuel by-passed from said chamber, a linkage ope tively interconnecting said means with said by-pass va and including an adjustable fulcrum, a thermostatic me responsive to the temperature of said engine and be adapted to move said fulcrum whenever the temperat of said engine is below normal to thereby increase amount of fuel distributed to said engine.

75. A fuel injection system for an internal combust engine comprising a fuel pump adapted to discharge f under pressure therefrom, a distributing chamber c nected to said pump outlet for distributing equal in ments of fuel to the cylinders of said engine, a by-p valve in said distributing chamber adapted to meter fuel flow to the cylinders of said engine by bypassing surplus fuel for return to said pump, means responsiv the fuel demands of said engine for exerting an actua force on said valve to meter the volume of distrib fuel in some predetermined proportion to the charge, richment means responsive to the operating condition said engine for exerting a supplementary force on valve effective to temporarily change said proporti 76. A fuel injection system for an internal combus engine a distributing chamber connected to said p outlet for distributing equal increments of fuel to cylinders of said engine, a bypass valve in said distribu chamber adapted to meter the fuel flow to the cylin of said engine by bypassing the surplus fuel for retur said pump, means responsive to the fuel demands of engine for exerting an actuating force on said valv meter the volume of distributed fuel in some pred mined proportion to the charge, a lever having one thereof operatively interconnected with enrichment m and the other end effective to exert a supplementary f on said valve effective to temporarily modify said ac ing force and said proportion.

77. A fuel injection system for an internal com tion engine comprising a fuel pump adapted to disch fuel under pressure therefrom, a distributing chamber nected to said pump outlet for distributing equa crements of fuel to the cylinders of said engine, a by valve in said distributing chamber adapted to mete anges in the rate of flow to open said first orifice from
y position when the rate of flow sensed exceeds a sub-
ntially fixed amount, and to close said first orifice when
rate of flow sensed decreases from this same amount,
lurality of variable orifices in said branches operatively
nected with said motor so that simultaneous changes
the area occur in said branch orifices and in said ori-
in said air conduit, and regulator means to maintain
rate of flow through said branch orifices substantially
stant.

0. A fuel injection system for an internal combustion
ine comprising an air induction system having an air
t, fuel discharge nozzles communicating with the
ine firing chambers, fuel supply means including pas-
es connected to said nozzles and a fuel pump con-
ted to said passages and normally maintaining fuel
er pump pressure throughout said passages to said
zles, fuel metering means associated with said supply
ns, a valve in said inlet controlling the effective area
eof, a servo-motor device operatively connected to
inlet on opposite sides of said valve and also opera-
y connected to said valve so as to move said valve
thereby maintain predetermined pressures on oppo-
sides thereof, and an operative connection between
valve and said fuel metering means for adjusting said
ring means in proportion to air flow past said valve.

. *A charge forming unit for an internal combustion
ne comprising an induction system adapted to supply
o the cylinders of said engine, fuel metering means
ted to distribute equal increments of metered fuel
id cylinders and including a fuel metering valve and
aphragm operatively interconnected therewith by a
ge, said diaphragm being responsive to the fuel de-
ds of said engine for actuating said metering valve in
ortion thereto, and thermostatic means for changing
mechanical advantage of said linkage to thereby
ge the proportions of air and fuel in said charge when
engine is operating at subnormal temperatures.*

. *A charge forming unit for an internal combustion
e having a plurality of cylinders, said unit compris-
n induction system adapted to supply a charge of air
id cylinders and including means for creating a pres-
signal indicative of said air flow, fuel metering
s adapted to distribute equal increments of metered
o said cylinders and including a fuel metering valve
diaphragm responsive to said signal, a linkage inter-
ecting said diaphragm with said valve, said linkage
ally having a mechanical advantage effective to actu-
id metering valve so that said metered fuel will flow
me predetermined proportion to said air flow, and
ostatic means for changing the mechanical advan-
of said linkage to thereby increase the proportion
l in said charge when said engine is operating at sub-
al temperatures.*

*A charge forming unit for an internal combustion
e having a plurality of cylinders, said unit compris-
induction system adapted to supply a charge of air
d cylinders and including means for creating a pres-
ignal indicative of the amount of said air flow, fuel
ing means adapted to distribute equal increments of
ed fuel to said cylinders and including a fuel meter-
alve and a diaphragm responsive to said signal, a
e interconnecting said diaphragm with said valve
cluding a lever pivoting about a fulcrum the posi-
f which determines the proportion of fuel and air
resultant charge, thermostatic means for changing
sition of said fulcrum to increase the proportion of
when said engine is below some predetermined
t.*

*A fuel injection system for an internal combustion
having a plurality of cylinders and an induction
with induction passages for said cylinders, said
ijection system comprising a pump connected to a
of fuel and having an outlet for discharging fuel
therefrom, metering means adapted to sense the amount
of air flowing through said induction system and being
connected to said pump outlet for metering and distribut-
ing equal increments of metered fuel to said cylinders in
proportion to the volume of said air flow, an enrichment
device operative only during certain engine operating con-
ditions to deliver a surplus of fuel to said metering means
during said conditions to override the normal metering
action of the fuel delivered by said pump to thereby pro-
duce a rich charge, and means for delivering excess fuel
delivered by the pump to the inlet side of the pump.*

*65. A fuel injection system for an internal combustion
engine having a plurality of cylinders and an induction
system for charging said cylinders, said injection system
comprising a fuel pump connected to a source of fuel
and having an outlet for discharging fuel therefrom, a dis-
tributor connected to said pump outlet for distributing
equal increments of fuel to said cylinders, means respon-
sive to the amount of air flowing through said induction
system and being effective to meter the quantity of dis-
tributed fuel in proportion to said air flow by by-passing
the surplus amount of fuel from said distributor, an en-
richment device interconnected with said means and being
operative during during certain engine operating condi-
tions to override the normal metering action by modifying
the amount of fuel by-passed from said distributor to
enrichen said charge during said condition, and means for
delivering excess fuel delivered by the pump to the inlet
side of the pump.*

*66. A fuel injection system for an internal combustion
engine having a plurality of cylinders and an induction
system for charging said cylinders, said injection system
comprising a fuel pump connected to a source of fuel and
having an outlet for discharging fuel therefrom, a dis-
tributor connected to said pump outlet for distributing
equal increments of fuel to said cylinders, a valve com-
municating with said distributor and being effective to
meter the amount of distributed fuel by by-passing the
surplus amount of fuel from said distributor for return
to said pump, means responsive to the quantity of air
flowing through said induction system, a linkage inter-
connecting said means with said valve for positioning said
valve to meter said fuel in proportion to said air flow, an
enrichment device effective during certain engine operat-
ing conditions to modify the action of said linkage on said
valve to thereby modify the normal metering action of
said means to change the air-fuel ratio of the charge dur-
ing certain engine operating conditions.*

*67. A fuel injection system for an internal combustion
engine having a plurality of cylinders and an induction
system for charging said cylinders, said injection system
comprising a fuel pump connected to a source of fuel and
having an outlet for discharging fuel therefrom, a dis-
tributing chamber having one end thereof connected to
said pump outlet, a plurality of injector lines radiating
from said chamber for distributing equal increments of
fuel to said cylinders, a valve communicating with the
other end of said distributing chamber and being effective
to meter the amount of distributed fuel by by-passing the
surplus amount of fuel from said distributor to said pump,
means responsive to the quantity of air flowing through
said induction system, a linkage interconnecting said
means with said valve for actuating said valve in propor-
tion to said air flow, an enrichment device effective during
only certain engine operating conditions to modify the
action of said linkage to modify the air-fuel ratio of the
charge during certain engine operating conditions.*

*68. A fuel injection system for an internal combustion
engine having a plurality of cylinders and an induction
system for charging said cylinders, said injection system
comprising a fuel pump connected to a source of fuel and
having an outlet for discharging fuel therefrom, a dis-
tributor connected to said pump outlet for distributing
equal increments of fuel to said cylinders, a valve com-
municating with said distributor and being effective to*

*fuel flow to the cylinders of said engine by bypassing the surplus fuel for return to said pump, means responsive to the fuel demands of said engine for exerting an actuating force on said valve to meter the volume of distributed fuel in some predetermined proportion to the charge, a thermostatic member interconnected with said bypass valve, said member being responsive to the temperature of said engine to exert a force on said lever to close said valve.*

*78. In an internal combustion engine having a plurality of cylinders and an induction system for charging said cylinders with a combustible charge of air and fuel, a fuel injection system for injecting metered quantities of fuel into the charges for said cylinders, said fuel injection system including a pump driven by said engine and having an output proportional to the speed of said engine, a distributor interconnected with said pump outlet for distributing equal increments of fuel to said cylinders, a bypass valve in said distributor effective to meter the quantity of said distributed fuel by bypassing the surplus fuel from said distributor for return to said pump, a pressure responsive member adapted to sense the pressure of the air in said induction system to exert a force on said bypass valve to thereby meter said fuel in some predetermined proportion to said charge, a lever mounted on a fixed pivot and having one end thereof connected to said valve for exerting a second force thereon, enrichment means connected to the other end of said lever for controlling the amount of said second force on said valve to change the proportions of said charge.*

*79. The combination of claim 78 wherein said enrichment means includes means responsive to the temperature of said engine for increasing said second force when said temperature is below normal.*

*80. The combinatoin of claim 78 wherein said enrichment means includes means responsive to opening movement of the throttle valve for said engine to increase said second force when said throttle valve is opened.*

*81. Charge forming apparatus for a multiple cylinder engine, said apparatus comprising an air induction conduit having a plurality of branches connecting to the respective engine cylinders, a mass air flow measuring device in said air induction conduit which reduces to sub-atmospheric the pressure in a portion of said conduit posterior thereto, a throttle in said air induction conduit between said air flow measuring device and said branches, a plurality of fuel injection nozzles, said nozzles being mounted adjacent to said respective conduit branches for discharging fuel therein at a rate proportional to the air flow therethrough as sensed by said air flow measuring device, a fuel pump having an outlet, a source of fuel for said pump, a fuel metering system including a distributing chamber connected with said outlet of said pump, a plurality of fuel lines interconnecting said distributing chamber and said nozzles and a fuel by-pass from said distributing chamber to said source of fuel, a reciprocably movable fuel control valve disposed in said by-pass for controlling the flow of fuel therethrough, and an operating mechanism for said control valve including a suction motor, a linkage interposed between said suction motor and said control valve for moving said control valve, a suction line extending from said suction motor to said sub-atmospheric portion of said air induction conduit at a point adjacent to said throttle, and a heat responsive element connecting with said linkage for changing the effect of said control mechanism in the movement of the control valve.*

*82. Charge forming apparatus for a multiple cylinder engine, said apparatus comprising an air induction conduit having a plurality of branches connecting to the respective engine cylinders, a mass air flow measuring device in said air induction conduit which reduces to sub-atmospheric the pressure in a portion of said conduit posterior thereto, a throttle in said air induction conduit between said air flow measuring device and said branches, a plurality of fuel injection nozzles, said nozzles being mounted adjacent to said respective conduit branches for discharging fuel therein at a rate proportional to the air flow therethrough as sensed by said air flow measuring device, a fuel pump having an outlet, a source of fuel for said pump, a fuel metering system including a distributing chamber connected with said outlet of said pump, a plurality of fuel lines inter-connecting said distributing chamber and said nozzles and a fuel by-pass from said distributing chamber to said source of fuel, a reciprocably movable fuel control valve disposed in said by-pass for controlling the flow of fuel therethrough, and an operating mechanism for said control valve including a suction motor, a linkage interposed between said suction motor and said control valve for applying a closing force on said control valve, a suction line extending from said suction motor to said sub-atmospheric portion of said air induction conduit at a point adjacent to said throttle, a heat responsive element connecting with said linkage for decreasing the closing force exerted upon the control valve by the linkage as the temperature of the heat responsive element is raised, and a heater operative upon starting of said engine for gradually raising the temperature of the heat responsive element thereby to decrease the fuel air ratio supplied to the engine.*

*83. Charge forming apparatus for a multiple cylinder engine, said apparatus comprising an air induction conduit having a plurality of branches connecting to the respective engine cylinders, a mass air flow measuring device in said air induction conduit which reduces to sub-atmospheric the pressure in a portion of said conduit posterior thereto, a throttle in said air induction conduit between said air flow measuring device and said branches, a plurality of fuel injection nozzles, said nozzles being mounted adjacent to said respective conduit branches for discharging fuel therein at a rate proportional to the air flow therethrough as sensed by said air flow measuring device, a fuel pump having an outlet, a source of fuel for said pump, a fuel metering system including a distributing chamber connected with said outlet of said pump, a plurality of fuel lines inter-connecting said distributing chamber and said nozzles and a fuel by-pass from said distributing chamber to said source of fuel, a reciprocably movable fuel control valve disposed in said by-pass for controlling the flow of fuel therethrough, and an operating mechanism for said control valve including a suction motor, a linkage interposed between said suction motor and said control valve for moving said control valve, a suction line extending from said suction motor to said sub-atmospheric portion of said air induction conduit at a point adjacent to said throttle, means for applying a biasing force to the control valve through said linkage to move said control valve towards its closed position, a heat responsive element for opposing said biasing force applied by said linkage as the temperature of said heat responsive element is raised, and a heater operative upon starting of said engine for gradually raising the temperature of said heat responsive element thereby to decrease the fuel air ratio supplied to the engine.*

References Cited by the Examiner

UNITED STATES PATENTS

The following references, cited by the Examiner, are of record in the patented file of this patent or the original patent.

| | | | |
|---|---|---|---|
| 2,378,036 | 6/45 | Reggio | 123—119 |
| 2,435,902 | 2/48 | Reggio | 123—119 |
| 2,447,261 | 8/48 | Mock | 123—119 |
| 2,673,556 | 3/54 | Reggio | 123—140 |
| 2,725,861 | 12/55 | Leibing | 123—119 |
| 2,857,145 | 10/58 | Morris | 123—139.17 |

RICHARD B. WILKINSON, *Primary Examiner.*

KARL J. ALBRECHT, RALPH H. BRAUNER, *Examiners.*